US012187373B1

(12) United States Patent
De La Rua et al.

(10) Patent No.: US 12,187,373 B1
(45) Date of Patent: Jan. 7, 2025

(54) SKATEBOARD FOOTPADS HAVING FOOT ENGAGEMENT STRUCTURES AND TRACTION INSERTS

(71) Applicant: Future Motion, Inc., Santa Cruz, CA (US)

(72) Inventors: Julian De La Rua, Santa Cruz, CA (US); Daniel Blachinsky, Squamish (CA)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 18/591,740

(22) Filed: Feb. 29, 2024

(51) Int. Cl.
  *B62J 25/00* (2020.01)
  *A63C 17/26* (2006.01)
  *B62K 11/00* (2006.01)

(52) U.S. Cl.
  CPC ............. *B62J 25/00* (2013.01); *A63C 17/262* (2013.01); *B62K 11/007* (2016.11)

(58) Field of Classification Search
  CPC ....... B62J 25/00; A63C 17/262; B62K 11/007
  See application file for complete search history.

(56) References Cited

U.S. PATENT DOCUMENTS

| 1,585,258 | A | 5/1926 | Moore |
| 4,023,864 | A | 5/1977 | Lang et al. |
| 4,039,200 | A | 8/1977 | McGonegle |
| 4,106,786 | A | 8/1978 | Talbott |
| 4,109,741 | A | 8/1978 | Gabriel |
| 4,134,599 | A | 1/1979 | DiMille et al. |
| 4,505,477 | A | 3/1985 | Wilkinson |
| 4,757,248 | A | 7/1988 | Fujioka et al. |

(Continued)

FOREIGN PATENT DOCUMENTS

| CN | 105774992 | 7/2016 |
| CN | 102527024 | 6/2021 |

(Continued)

OTHER PUBLICATIONS

Ben Smither, Balancing Scooter / Skateboard:, video, retrieved Sep. 22, 2016 from https://www.youtube.com/watch?v=HGbbag9dkIU, uploaded to YouTube on Mar. 4, 2007.

(Continued)

*Primary Examiner* — Jacob B Meyer
(74) *Attorney, Agent, or Firm* — Kolitch Romano Dascenzo Gates LLC

(57) ABSTRACT

Footpad assemblies of the present disclosure include a footpad configured to be coupled to a frame of an electric vehicle and a foot engagement structure coupled to the footpad. The foot engagement structure is configured to contact the rider's foot to prevent undesired movement of the rider's foot during use of the electric vehicle. The footpad includes a recess defined in an upper surface of the footpad and an insert is disposed in the recess and coupled to the footpad. The insert is operatively coupled to the foot engagement structure. The foot engagement structure may comprise a foot stop extending above the footpad and configured to abut a side portion of the rider's foot and/or a traction insert configured to contact a bottom of the user's foot to provide grip or traction. The position and rotational orientation of the foot stop relative to the footpad is configured to be adjustable by a user.

20 Claims, 20 Drawing Sheets

(56) References Cited

U.S. PATENT DOCUMENTS

| | | | |
|---|---|---|---|
| 4,795,181 A | 1/1989 | Armstrong | |
| 4,997,196 A | 3/1991 | Wood | |
| 5,000,470 A | 3/1991 | Kamler et al. | |
| 5,119,277 A | 6/1992 | Copley et al. | |
| 5,132,883 A | 7/1992 | La Lumandier | |
| 5,462,302 A | 10/1995 | Leitner | |
| 5,487,441 A | 1/1996 | Endo et al. | |
| 5,509,679 A | 4/1996 | Leitner | |
| 5,513,080 A | 4/1996 | Magle et al. | |
| 5,553,881 A | 9/1996 | Klassen et al. | |
| 5,628,524 A | 5/1997 | Klassen et al. | |
| 5,794,730 A | 8/1998 | Kamen | |
| 5,997,018 A * | 12/1999 | Lee | A63C 17/1409 280/11.28 |
| 6,050,357 A | 4/2000 | Staelin et al. | |
| 6,089,592 A * | 7/2000 | Negus | A63C 5/03 280/619 |
| 6,100,680 A | 8/2000 | Vig et al. | |
| 6,189,899 B1 * | 2/2001 | Carlson | A63C 10/18 280/14.22 |
| 6,206,397 B1 | 3/2001 | Klassen et al. | |
| 6,223,104 B1 | 4/2001 | Kamen et al. | |
| 6,242,701 B1 | 6/2001 | Breed et al. | |
| 6,288,505 B1 | 9/2001 | Heinzmann et al. | |
| 6,332,103 B1 | 12/2001 | Steenson, Jr. et al. | |
| 6,408,240 B1 | 6/2002 | Morrell et al. | |
| 6,488,301 B2 | 12/2002 | Klassen et al. | |
| 6,536,788 B1 | 3/2003 | Kuncz et al. | |
| 6,538,411 B1 | 3/2003 | Field et al. | |
| 6,553,271 B1 | 4/2003 | Morrell | |
| 6,561,294 B1 | 5/2003 | Kamen et al. | |
| 6,779,621 B2 | 8/2004 | Kamen et al. | |
| 6,789,640 B1 | 9/2004 | Arling et al. | |
| 6,827,163 B2 | 12/2004 | Amsbury et al. | |
| 6,874,591 B2 | 4/2005 | Morrell et al. | |
| 6,932,371 B2 | 8/2005 | Perez | |
| 6,965,206 B2 | 11/2005 | Kamen et al. | |
| 6,992,452 B1 | 1/2006 | Sachs et al. | |
| 7,023,330 B2 | 4/2006 | Kamen et al. | |
| 7,053,289 B2 | 5/2006 | Iwai et al. | |
| RE39,159 E | 7/2006 | Klassen et al. | |
| 7,090,040 B2 | 8/2006 | Kamen et al. | |
| 7,091,724 B2 | 8/2006 | Heinzmann et al. | |
| 7,130,702 B2 | 10/2006 | Morrell | |
| 7,138,774 B2 | 11/2006 | Negoro et al. | |
| 7,157,875 B2 | 1/2007 | Kamen et al. | |
| 7,172,044 B2 | 2/2007 | Bouvet | |
| 7,198,280 B2 | 4/2007 | Hara | |
| 7,219,930 B2 * | 5/2007 | Kiernan | A63C 10/10 280/809 |
| 7,263,453 B1 | 8/2007 | Gansler et al. | |
| 7,424,927 B2 | 9/2008 | Hiramatsu | |
| 7,467,681 B2 | 12/2008 | Hiramatsu | |
| 7,467,891 B2 | 12/2008 | Gennissen et al. | |
| 7,479,097 B2 | 1/2009 | Rosborough et al. | |
| 7,581,743 B2 | 9/2009 | Graney | |
| 7,592,766 B2 | 9/2009 | Patel et al. | |
| 7,740,099 B2 | 6/2010 | Field et al. | |
| 7,757,794 B2 | 7/2010 | Heinzmann et al. | |
| 7,789,174 B2 | 9/2010 | Kamen et al. | |
| 7,811,217 B2 | 10/2010 | Odien | |
| 7,857,088 B2 | 12/2010 | Field et al. | |
| 7,900,725 B2 | 3/2011 | Heinzmann et al. | |
| 7,962,256 B2 | 6/2011 | Stevens et al. | |
| 7,963,352 B2 | 6/2011 | Alexander | |
| 7,979,179 B2 | 7/2011 | Gansler | |
| 7,979,197 B2 | 7/2011 | Finn et al. | |
| 8,052,293 B2 | 11/2011 | Hurwitz | |
| 8,066,297 B2 | 11/2011 | Beale et al. | |
| 8,083,313 B2 | 12/2011 | Karppinen et al. | |
| 8,146,696 B2 | 4/2012 | Kaufman | |
| 8,170,780 B2 | 5/2012 | Field et al. | |
| 8,272,657 B2 | 9/2012 | Graney et al. | |
| 8,382,136 B2 | 2/2013 | Beale et al. | |
| 8,467,941 B2 | 6/2013 | Field et al. | |
| 8,469,569 B1 | 6/2013 | Tunnicliffe et al. | |
| 8,490,723 B2 | 7/2013 | Heinzmann et al. | |
| 8,543,307 B2 | 9/2013 | Takenaka et al. | |
| 8,562,386 B2 | 10/2013 | Carlson et al. | |
| 8,567,537 B2 | 10/2013 | Gomi et al. | |
| 8,682,487 B2 | 3/2014 | Kurth et al. | |
| 9,097,598 B2 | 8/2015 | Grassi | |
| 9,101,817 B2 | 8/2015 | Doerksen | |
| 9,211,470 B2 | 12/2015 | Bigler | |
| 9,344,026 B2 | 5/2016 | Tang | |
| 9,387,363 B1 | 7/2016 | Polinsky | |
| 9,400,505 B2 | 7/2016 | Doerksen | |
| 9,452,345 B2 | 9/2016 | Doerksen et al. | |
| 9,457,260 B2 * | 10/2016 | Weber | A63C 17/015 |
| 9,598,141 B1 | 3/2017 | Doerksen et al. | |
| 9,604,124 B2 * | 3/2017 | Aders | A63C 17/262 |
| 9,789,384 B1 | 10/2017 | Ma | |
| 9,802,109 B2 | 10/2017 | Doerksen | |
| 9,891,624 B2 | 2/2018 | Murakami et al. | |
| 9,943,749 B2 | 4/2018 | Cerboneschi | |
| 9,956,474 B2 | 5/2018 | Zhou et al. | |
| 9,962,597 B2 | 5/2018 | Doerksen et al. | |
| 9,999,827 B2 | 6/2018 | Wood | |
| 10,010,784 B1 | 7/2018 | Doerksen et al. | |
| 10,167,036 B2 | 1/2019 | Ying | |
| 10,207,764 B2 | 2/2019 | Li et al. | |
| 10,307,659 B2 | 6/2019 | Bigler | |
| 10,392,075 B2 | 8/2019 | Otsuki et al. | |
| 10,456,658 B1 * | 10/2019 | Doerksen | G01C 19/42 |
| 10,682,565 B1 * | 6/2020 | Woolson | A63C 17/014 |
| 10,786,726 B2 | 9/2020 | Doerksen et al. | |
| 10,913,509 B2 | 2/2021 | Liu | |
| 10,933,937 B2 | 3/2021 | Shang | |
| 11,045,712 B1 | 6/2021 | Orehek | |
| 11,117,474 B2 | 9/2021 | Doerksen et al. | |
| 11,130,543 B2 | 9/2021 | Ying | |
| 11,136,084 B2 | 10/2021 | Shang | |
| 11,273,364 B1 | 3/2022 | Doerksen | |
| 11,433,294 B2 * | 9/2022 | Woolson | A63C 17/08 |
| 11,590,409 B2 * | 2/2023 | Doerksen | A63C 17/016 |
| 11,731,031 B2 * | 8/2023 | Hollyfield | A63C 17/0013 280/7.15 |
| 11,745,086 B1 * | 9/2023 | Palmer | A63C 17/015 280/87.042 |
| 2002/0074176 A1 | 6/2002 | Justus et al. | |
| 2004/0065494 A1 | 4/2004 | Nelson | |
| 2005/0121238 A1 | 6/2005 | Ishii | |
| 2005/0126832 A1 | 6/2005 | Amsbury et al. | |
| 2005/0241864 A1 | 11/2005 | Hiramatsu | |
| 2006/0038520 A1 | 2/2006 | Negoro et al. | |
| 2006/0049595 A1 | 3/2006 | Crigler et al. | |
| 2006/0170174 A1 | 8/2006 | Hiramatsu | |
| 2006/0213711 A1 | 9/2006 | Hara | |
| 2006/0260862 A1 | 11/2006 | Nishikawa | |
| 2007/0194558 A1 | 8/2007 | Stone et al. | |
| 2007/0254789 A1 | 11/2007 | Odien | |
| 2008/0294094 A1 | 11/2008 | Mhatre et al. | |
| 2009/0178877 A1 | 7/2009 | Keller et al. | |
| 2009/0261557 A1 | 10/2009 | Beale et al. | |
| 2010/0133786 A1 * | 6/2010 | Cunningham | A63C 10/18 280/623 |
| 2010/0321149 A1 | 12/2010 | Foster | |
| 2010/0330876 A1 | 12/2010 | Carlson et al. | |
| 2011/0071711 A1 | 3/2011 | Sharp et al. | |
| 2011/0109060 A1 | 5/2011 | Earle et al. | |
| 2011/0309772 A1 | 12/2011 | Forgey | |
| 2012/0173107 A1 | 7/2012 | Takenaka et al. | |
| 2012/0232734 A1 | 9/2012 | Pelletier | |
| 2013/0081891 A1 | 4/2013 | Ulmen et al. | |
| 2013/0121198 A1 | 5/2013 | Xiao et al. | |
| 2013/0175943 A1 | 7/2013 | Tackett | |
| 2013/0206493 A1 | 8/2013 | Larson et al. | |
| 2014/0172262 A1 | 6/2014 | Andoh | |
| 2014/0326525 A1 | 11/2014 | Doerksen | |
| 2015/0096820 A1 | 4/2015 | Strack | |
| 2015/0107922 A1 | 4/2015 | Bigler | |
| 2015/0109722 A1 | 4/2015 | Toyota et al. | |
| 2015/0290525 A1 * | 10/2015 | Hofmann | A63C 10/28 280/14.22 |

(56) References Cited

U.S. PATENT DOCUMENTS

| | | |
|---|---|---|
| 2015/0323935 A1 | 11/2015 | Doerksen |
| 2016/0059109 A1 | 3/2016 | Bigler |
| 2016/0107070 A1* | 4/2016 | Middleton ............ A63C 17/262 280/87.042 |
| 2016/0121198 A1 | 5/2016 | Doerksen et al. |
| 2016/0129957 A1 | 5/2016 | Murakami et al. |
| 2016/0296825 A1* | 10/2016 | Wolniansky ............ B63B 32/47 |
| 2017/0088212 A1 | 3/2017 | Edney |
| 2017/0113121 A1* | 4/2017 | Imbrie ................ A63C 17/015 |
| 2017/0120139 A1 | 5/2017 | Ma |
| 2017/0361205 A1 | 12/2017 | Bigler |
| 2017/0361900 A1 | 12/2017 | Doerksen |
| 2018/0056169 A1 | 3/2018 | Doerksen |
| 2018/0161661 A1 | 6/2018 | Ma |
| 2018/0169506 A1 | 6/2018 | Ma |
| 2019/0193803 A1 | 6/2019 | Desberg et al. |
| 2020/0030684 A1* | 1/2020 | Corvello ............ A63C 17/262 |
| 2020/0282293 A1 | 9/2020 | Turner |
| 2024/0157225 A1* | 5/2024 | Robinson ............ A63C 17/262 |

FOREIGN PATENT DOCUMENTS

| | | |
|---|---|---|
| KR | 1020160088856 | 7/2016 |
| KR | 101663781 | 10/2016 |
| TW | 450823 | 8/2001 |
| WO | WO9313974 | 7/1993 |
| WO | WO2009071879 | 6/2009 |
| WO | WO2017053443 | 3/2017 |

OTHER PUBLICATIONS www.electricunicycle.com, "Leviskate self-balancing one-wheel skateboard", video, retrieved Sep. 22, 2016 from https://www.youtube.com/watch?v=462Jj1xSSqc, uploaded to YouTube on Aug. 5, 2007.

John Xenon, "One wheel self balancing skateboard Ver2 Jan. 2009. #2", video, retrieved Sep. 22, 2016 from https://www.youtube.com/watch?v=8RPFNUsuW78, uploaded to YouTube on Jan. 3, 2009.

Rodger Cleye, "Leviskate (Balancing Skateboard) in Operation", video, retrieved Sep. 22, 2016 from https://www.youtube.com/watch?v=eN2J8m_E0go, uploaded to YouTube on Apr. 18, 2013.

* cited by examiner

SKATEBOARD FOOTPADS HAVING FOOT ENGAGEMENT STRUCTURES AND TRACTION INSERTS

FIELD

This disclosure relates to footpads for self-stabilizing electric vehicles.

INTRODUCTION

Electric skateboards have grown in popularity over the past several years. Many companies have entered this market with differing designs. Generally speaking, many of these boards lack customizable features which enable riders to customize their boards according to their preferences.

SUMMARY

The present disclosure provides systems, apparatuses, and methods relating to footpad assemblies for self-balancing electric vehicles.

In some examples, a footpad assembly for a self-balancing electric vehicle includes: a footpad configured to be coupled to a frame of the vehicle and to receive a rider's foot on an upper surface of the footpad, wherein a recess is defined in the upper surface; an insert disposed in the recess and secured to the footpad, wherein the insert comprises an upper wall having an elongate opening and a side wall extending downward from a periphery of the upper wall, such that the upper wall is spaced from a floor of the recess to form a T-slot; and a foot engagement member operatively coupled to the insert.

In some examples, a footpad assembly for a self-balancing electric vehicle includes: a footpad configured to be coupled to a frame of the vehicle and to receive a rider's foot on an upper surface of the footpad; a first recess and a second recess defined in the upper surface of the footpad; a first slotted insert disposed in the first recess and a second slotted insert disposed in the second recess, wherein the first and second slotted inserts are secured to the footpad; and a first T-slot formed between the first slotted insert and a first floor of the first recess and a second T-slot formed between the second slotted insert and a second floor of the second recess.

Features, functions, and advantages may be achieved independently in various embodiments of the present disclosure, or may be combined in yet other embodiments, further details of which can be seen with reference to the following description and drawings.

DETAILED DESCRIPTION

Figure 1:
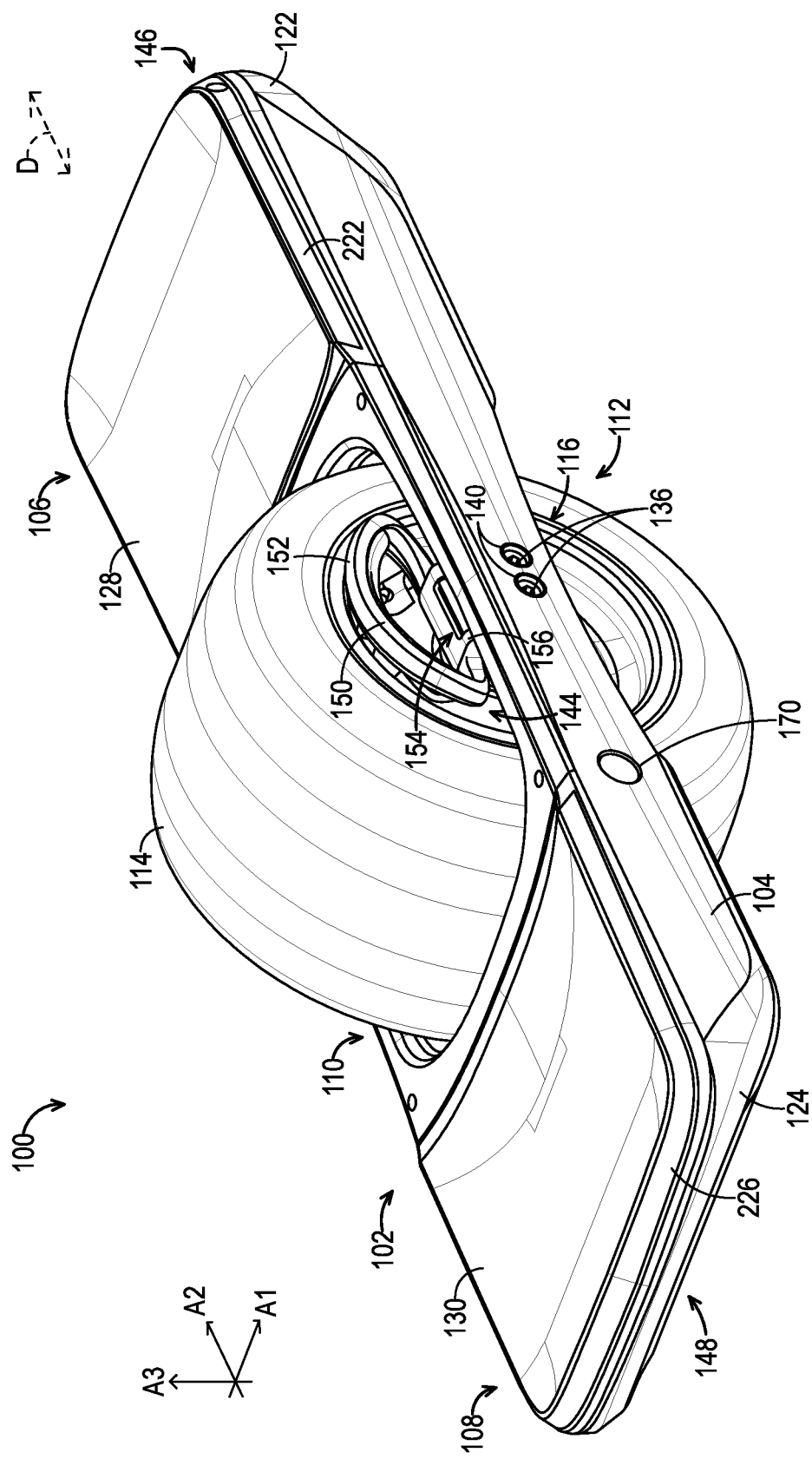
FIG. 1 is an isometric view of an illustrative one-wheeled skateboard in accordance with aspects of the present disclosure.

Various aspects and examples of a footpad assembly having foot engagement structures, as well as related methods, are described below and illustrated in the associated drawings. Unless otherwise specified, a footpad assembly in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

The terms "inboard," "outboard," "forward," "rearward," and the like are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

A "controller" or "electronic controller" includes processing logic programmed with instructions to carry out a controlling function with respect to a control element. For example, an electronic controller may be configured to receive an input signal, compare the input signal to a selected control value or setpoint value, and determine an output signal to a control element (e.g., a motor or actuator) to provide corrective action based on the comparison. In another example, an electronic controller may be configured to interface between a host device (e.g., a desktop computer, a mainframe, etc.) and a peripheral device (e.g., a memory device, an input/output device, etc.) to control and/or monitor input and output signals to and from the peripheral device.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

In general, a footpad assembly for a self-balancing electric vehicle includes a footpad and one or more foot engagement structures, e.g., foot stops and/or traction members, releasably coupled to the footpad. The footpad assembly includes one or more inserts coupled to the footpad and configured to be operatively coupled to the one or more foot engagement structures to the footpad. The foot engagement members are configured to contact, abut, and/or engage the rider's foot to prevent undesired motion of the rider's foot relative to the footpad during use of the electric vehicle.

In some examples, the footpad is configured to be coupled to a frame of the electric vehicle. The footpad comprises any suitable structures configured to receive the rider's foot and to be releasably coupled to the foot engagement structures. In some examples, the footpad includes one or more recesses, depressions, and/or channels defined in an upper surface of the footpad. Each of the one or more recesses is configured to receive a respective one of the one or more inserts which are configured to be coupled to the one or more foot engagement structures. The footpad may include any suitable number of recesses and the recesses may be disposed at any suitable positions of the footpad dependent on the desired positions of the foot engagement structures.

The foot engagement structures may comprise any suitable components configured to contact the rider's foot and prevent undesired motion of the foot or provide added traction. In some examples, one or more of the foot engagement members include a foot stop coupled to the insert of the footpad and having a rigid body disposed above the upper surface of the footpad. The foot stop may be configured to contact a side portion or upper portion of the user's foot. In some examples, one or more of the foot engagement members include a traction member coupled to the insert of the footpad and configured to contact a bottom portion of the user's foot and to provide added traction, e.g., to prevent the rider's foot from slipping during use. The traction member may have a textured upper surface that is generally coplanar or flush with the insert of the footpad and adjacent portions of the upper surface of the footpad, such that the textured upper surface is positioned to contact the bottom (e.g., the sole) of the rider's foot.

In some examples, one or more of the foot engagement structures are coupled to the footpad, such that a position of the foot engagement structure is configured to be selectively adjustable by the user. For example, the foot stop may be coupled to a slot nut which is disposed within a slot formed between the insert and the recess of the footpad. The slot nut may be selectively translatable along a length of the slot to translate the foot stop relative to the footpad. In some examples, the foot stop may include one or more components configured to facilitate adjusting a lateral position of the foot stop relative to the insert of the footpad and/or a rotational orientation of the foot stop relative to the footpad. In some examples, one or more of the foot engagement members are configured to be selectively adjustable in three distinct degrees of freedom, e.g., longitudinal translation relative the footpad, lateral translation relative to the footpad, and rotational orientation.

In some examples, the footpad assemblies of the present disclosure include an integrated foot detection system configured to detect when the rider's foot is received by the footpad. For example, the footpad assemblies may include a membrane switch embedded or layered into the footpad. The membrane switch may comprise one or more pressure transducers configured to detect pressure from one or more portions of the rider's foot (e.g., the toe and/or the heel). In some examples, the membrane switch is bendable or flexible in one direction (e.g., on one axis). The membrane switch may include one or more slots to facilitate conforming to a curvature of the footpad and to relieve stress on the membrane switch during bending.

Footpad assemblies may be utilized with any suitable electric vehicle configured to have footpads for receiving the feet of the rider. In some examples, footpad assemblies of the present disclosure are utilized with a self-balancing skateboard having two deck portions on either side of a central opening. Footpad assemblies may form at least a portion of the two deck portions and may be coupled to a frame of the skateboard. The footpad assemblies are each configured to support a respective foot of a user oriented as on a standard skateboard, such that the vehicle is ridden with the user facing approximately ninety degrees to the direction of travel. A single wheel (or side-by-side wheels) is supported in the central opening on an axle and driven by a motor (e.g., a hub motor). The board is therefore tiltable about the axis of the wheel (i.e., about an axis of rotation defined by the axle). An onboard electronic controller is configured to receive orientation information indicating an orientation of the board. In response to this orientation information, the controller causes the hub motor to propel the board, and provides a self-stabilizing feature.

Examples, Components, and Alternatives

The following sections describe selected aspects of illustrative footpad assemblies for electric vehicles as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electric Vehicle

As shown in FIGS. 1-8, this section describes an illustrative electric vehicle 100. Vehicle 100 is an example of the electric vehicles described in the Overview. FIGS. 1-8 show vehicle 100 from various viewpoints.

Vehicle 100 is a single-wheeled, self-stabilizing skateboard including a board 102 (AKA a tiltable portion of the vehicle, a platform, and/or a foot deck) having a frame 104 supporting a first deck portion 106 and a second deck portion 108 defining an opening 110 therebetween. Board 102 may generally define a plane. Each deck portion 106, 108 (or foot pad portion thereof) is configured to receive and support a left or right foot of a rider oriented generally perpendicular to a direction of travel of the board (see FIGS. 1 and 2), the direction of travel generally indicated at D. First and second deck portions 106, 108 may be formed of a same physical piece, may be unitary with the frame, or may be separate pieces. First and second deck portions 106, 108 may be included in the definition of board 102. In some examples, first and second deck portions 106, 108 include footpad assemblies 400, described further below.

Vehicle 100 includes a wheel assembly 112 having a rotatable ground-contacting element 114 (e.g., a tire, wheel, or continuous track) disposed between and extending above first and second deck portions 106, 108, and a motor assembly 116 configured to rotate ground-contacting element 114 to propel the vehicle. As shown in FIG. 1 and elsewhere, vehicle 100 may include exactly one ground-contacting element, disposed between the first and second deck portions. In some examples, vehicle 100 may include a plurality of ground-contacting elements (e.g., coaxial wheels).

Wheel assembly 112 is disposed between first and second deck portions 106, 108, and ground-contacting element 114 is coupled to motor assembly 116. Motor assembly 116 includes an axle 126 (AKA a shaft), which couples motor assembly 116 to board 102, e.g., by one or more axle mounts and one or more fasteners, such as a plurality of bolts. In some examples, axle 126 is coupled to board 102 by way of a suspension system. In some examples, motor assembly 116 is configured to rotate ground-contacting element 114 around (or about) axle 126 to propel vehicle 100. For example, motor assembly 116 may include an electric motor, such as an electric hub motor, configured to rotate ground-contacting element 114 about axle 126 to propel vehicle 100 along the ground. For convenience, ground-contacting element 114 is hereinafter referred to as a tire or wheel, although other suitable embodiments may be provided.

First and second deck portions 106, 108 are located on opposite sides of wheel assembly 112, with elongate board 102 being dimensioned to approximate a skateboard. In some embodiments, the board approximates a longboard skateboard, snowboard, surfboard, or may be otherwise desirably dimensioned. In some examples, deck portions 106, 108 of board 102 are at least partially covered with non-slip material portions 128, 130 (e.g., grip tape or other textured material) to aid in rider control and protect underlying components.

Frame 104 may include any suitable structure configured to rigidly support the deck portions and to be coupled (directly or indirectly) to the axle of the wheel assembly, such that the weight of a rider is supported on tiltable board 102, and the board has a fulcrum at the axle. Frame 104 may include one or more frame members 118, on which deck portions 106 and 108 may be mounted, and which may further support additional elements and features of the vehicle, such as a charging port 172, a switch 170, and end bumpers 122, 124, as well as lighting assemblies, battery and electrical systems, electronics, controllers, and the like (see, e.g., FIG. 9 and corresponding description below).

Deck portions 106 and 108 may include any suitable structures configured to support the feet of a rider, such as non-skid surfaces 128, 130, as well as vehicle-control features, such as various sensors and a rider detection system 168. In some examples, the rider detection system includes a rider detection sensor in the form of a pressure switch or a strain gauge in communication with a controller of the vehicle. The rider detection sensor may include a plurality of pressure switches housed in a waterproof casing to form a membrane switch. Deck portions 106 and 108, as well as related features, are described in further detail below. In some examples, first and/or second deck portions 106, 108 include footpad assemblies 400, described further below.

Shaft or axle 126 of motor assembly 116 is coupled to frame 104, as shown in FIG. 1. For example, the axle may be directly attached to frame 104, or may be coupled to the frame at each end through a respective connection or axle mounting block 132, 134 (also referred to as an axle mount or a simply a mounting block). Axle 126 may be bolted or otherwise affixed to mounting blocks 132, 134, e.g., at either end, which in turn may be bolted or affixed to frame 104 using suitable fasteners (e.g., by bolts 136, 138). Through-holes 140, 142 may be provided in frame 104 for receiving fasteners of the axle and mounting blocks, thereby securing the components together. In some examples, as mentioned above, axle 126 is coupled to frame 104 by a suspension system (not shown).

Vehicle 100 has a pitch axis A1, a roll axis A2, and a yaw axis A3 (see FIG. 1). Pitch axis A1 is the axis about which tire 114 is rotated by motor assembly 116. For example, pitch axis A1 may pass through axle 126 (e.g., pitch axis A1 may be parallel to and aligned with an elongate direction of axle 126). Roll axis A2 is perpendicular to pitch axis A1, and extends in direction D (i.e., the direction in which vehicle 100 is propelled by the motor assembly). For example, roll axis A2 may correspond to a long axis of board 102. Yaw axis A3 is perpendicular both to pitch axis A1 and to roll axis A2. Yaw axis A3 is normal to a plane defined by deck portions 106, 108, as shown in FIG. 1. Axes A1 and A2 are analogous to the Y and X axes (e.g., corresponding to horizontal), while axis A3 is analogous to the Z axis (e.g., corresponding to vertical). Pitch axis A1 and roll axis A2 may lie in a plane of the board. In some embodiments, the pitch and roll axes may define this plane.

Tire 114 may be wide enough in a heel-toe direction (e.g., in a direction parallel to pitch axis A1) that the rider can balance in the heel-toe direction manually, i.e., by shifting his or her own weight, without automated assistance from the vehicle. Tire 114 may be tubeless, or may be used with an inner tube. In some examples, tire 114 may be a non-pneumatic tire. For example, tire 114 may be "airless," solid, and/or may comprise a foam. Tire 114 may have a profile such that the rider can lean vehicle 100 over an edge of the tire (and/or pivot the board about roll axis A2 and/or yaw axis A3) through heel and/or toe pressure to facilitate cornering of vehicle 100.

Motor assembly 116 may include any suitable driver of tire/wheel 114, such as an electric hub motor 144 mounted within wheel 114. The hub motor may be internally geared or may be direct-drive. The use of a hub motor facilitates the elimination of chains and belts, and enables a form factor that considerably improves maneuverability, weight distribution, and aesthetics. Mounting tire 114 onto hub motor 144 may be accomplished by either a split-rim design that may use hub adapters, which may be bolted on to hub motor 144, or by casting a housing of the hub motor such that it provides mounting flanges for a tire bead directly on the housing of the hub motor.

With continuing reference to FIGS. 1-8, first bumper 122 (AKA the front bumper) is integrated into (or removably coupled to) a first end 146 of board 102 proximate first deck portion 106, and second bumper 124 (AKA the rear bumper) is integrated into (or removably coupled to) a second end 148 of board 102 proximal second deck portion 108. Bumpers 122, 124 may be referred to as skid pads, and may be replaceable and/or selectively removable. For example, the bumpers may include replaceable polymer parts or components, and/or may each be entirely replaceable as a single (e.g., monolithic) piece. In some examples, bumpers 122, 124 each comprise a thermoplastic polymer, such as acrylonitrile butadiene styrene (ABS). In some embodiments, the bumpers are configured to allow the rider to bring vehicle 100 to a stop in an angled orientation (e.g., by setting one end of the board against the ground after the rider removes their foot from a rider detection device or switch, which is described below in further detail). In this context, the bumpers may be configured to be abrasion-resistant and/or ruggedized.

First bumper 122 and/or second bumper 124 each include a bumper body configured to form a distal, external end of board 102, and an expanse 125 extending from the body to form a lower external surface of board 102. In some examples, each lateral edge of expanse 125 includes a lengthwise channel 127 configured to slidingly mate with a corresponding inward protrusion 129 disposed along a discrete length of each of the respective side rails of frame 104.

As shown in FIG. 1 and elsewhere, vehicle 100 further includes a stowable handle 150. Handle 150 is disposed on a lateral side of wheel 114, adjacent hub motor 144, and is transitionable between a first configuration, in which a graspable grip portion 152 of the handle is stowed in a position proximate the hub motor, and a second configuration, in which grip portion 152 is pivoted or folded into a position extending or protruding transverse to the stowed position, such that the grip portion may be engaged by a hand of the user to carry or transport the board. With the board in an operational position on a support surface, the grip of the handle may be substantially vertical in the first configuration (preventing breakage, interference with riding, etc.) and substantially horizontal in the second configuration. The first configuration may be referred to as the "stowed" position, the "up" position, the "riding" position, the "operational" position, the "undeployed" position, and/or the "in" position. The second configuration may be referred to as the "carrying" position, the "down" position, the "portable" position, the "deployed" position, and/or the "out" position.

In addition to grip portion 152, handle 150 includes a hinge 154 comprising hinge knuckles 156 configured to receive a hinge pin. Handle 150 may be pivotably coupled to any suitable fixed feature of the vehicle, such as the frame, fender, or axle block. In the example depicted in FIGS. 1-8, handle 150 is coupled to axle mounting block 134 by hinge 154, e.g., on an inboard upper side of the block. In some examples, a magnetic tab is configured to contact and be biased toward (i.e., attracted to) mounting block 134 to retain handle 150 while in the stowed position. In some examples, a spring-loaded hinge (e.g., using a torsion spring) may be utilized in addition to or instead of the magnet arrangement.

Components of handle 150 may be constructed using injection-molded plastic and/or machined or cast metal. Portions configured to be grasped manually by the user may be overmolded using a resilient material, e.g., a rubber or a soft plastic, to create a more comfortable grip.

Vehicle 100 may include any suitable apparatus, device, mechanism, and/or structure for preventing water, dirt, or other road debris from being transferred by the ground-contacting element to the rider. For example, vehicle 100 may include a fender (AKA a full fender) configured to fully cover an upper periphery of tire 114. The fender is coupled to frame 104, e.g., using fasteners and/or magnetic connectors, and configured to prevent debris from being transferred from tire 114 to the rider, such as when tire 114 is rotated about pitch axis A1.

Figure 9:
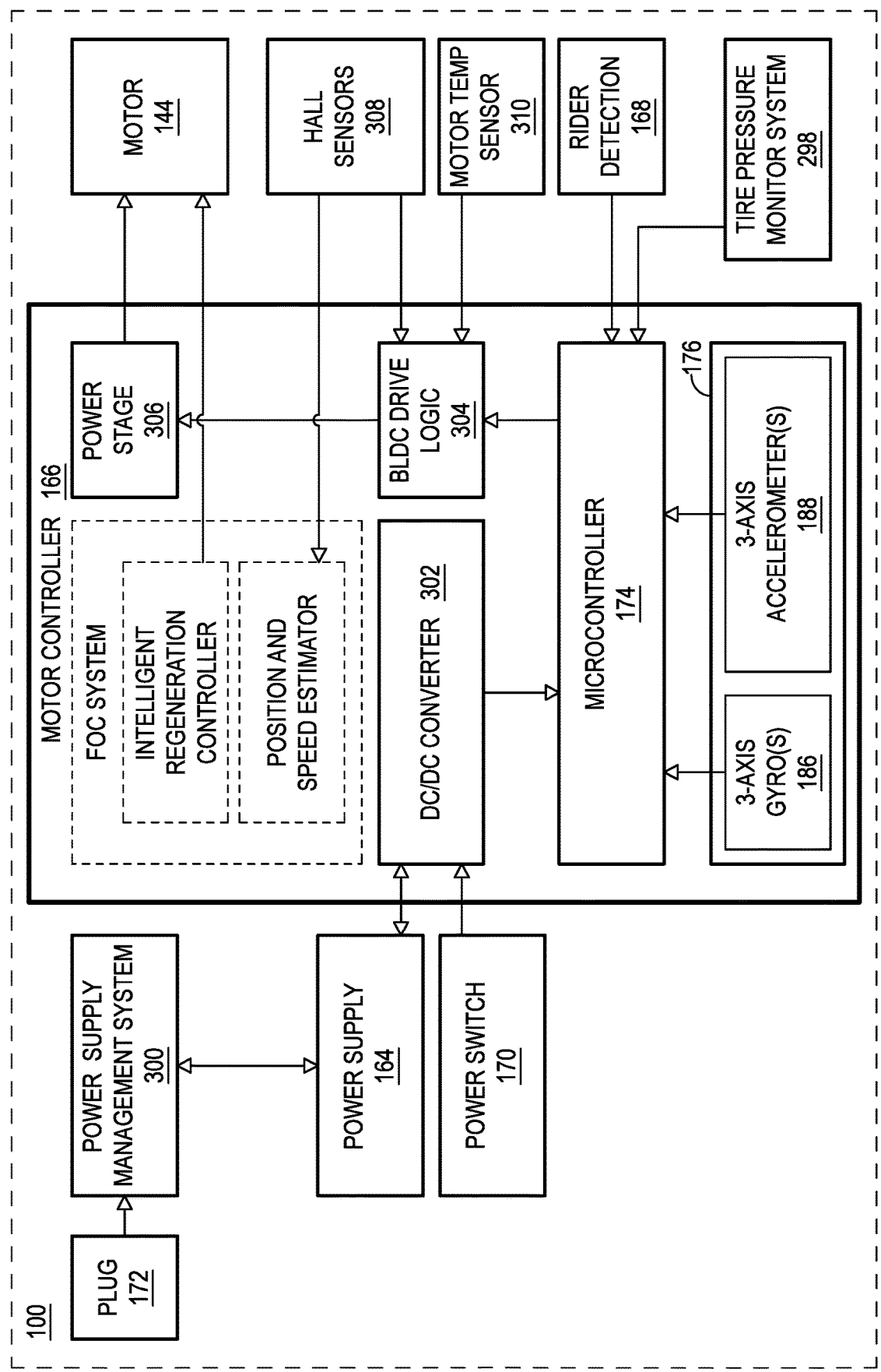
FIG. 9 is a schematic block diagram of a control system suitable for use with the skateboard of FIG. 1.

As indicated in FIG. 9, the one or more electrical components of vehicle 100 may include a power supply 164, a motor controller 166, a rider detection device 168, a power switch 170, and a charge plug receptacle 172. Further description is provided below, with respect to FIG. 9.

Power supply 164 may include one or more batteries (e.g., secondary or rechargeable batteries), such as one or more lithium-ion batteries that are relatively light in weight and have a relatively high power density. In some examples, power supply 164 may include one or more lithium iron phosphate batteries, one or more lithium polymer batteries, one or more lithium cobalt batteries, one or more lithium manganese batteries, or a combination thereof. For example, power supply 164 may include sixteen (16) A123 lithium iron phosphate batteries (e.g., size 8050). The batteries of power supply 164 may be arranged in a 16S1P configuration, or any other suitable configuration.

Motor controller 166 will generally include suitable electronics for controlling the vehicle motor. For example, a microcontroller 174 and/or one or more sensors 176 (or at least one sensor) may be included in or connected to motor controller 166 (see FIG. 9). At least one of the sensors may be configured to measure orientation information (or an orientation) of board 102. For example, the sensors may be configured to sense movement of board 102 about and/or along the pitch, roll, and/or yaw axes. The motor may be configured to cause rotation of wheel 114 based on the orientation of board 102. In particular, motor controller 166 may be configured to receive orientation information measured by the at least one sensor and to cause motor assembly 116 to propel the electric vehicle based on the orientation information. For example, motor controller 166 may be configured to drive hub motor 144 based on received sensed movement of board 102 from the sensors via microcontroller 174 to propel and/or actively balance vehicle 100.

In general, at least a portion of the electrical components are integrated into board 102. For example, board 102 includes a first environmental enclosure that houses power supply 164, and a second environmental enclosure that houses motor controller 166. The environmental enclosures are configured to protect the one or more electrical components from being damaged, such as by water ingress.

Vehicle 100 further includes a plurality of light assemblies, such as one or more headlight and/or taillight assemblies (see, e.g., FIGS. 3 and 4), and a battery indicator. For example, a first headlight/taillight assembly (or first light assembly) 180 may be disposed on or at (and/or connected to) first end portion 146 of the board (e.g., at a distal end portion of first deck portion 106), and a second headlight/taillight assembly 182 may be disposed on or at (and/or connected to) second end portion 148 of the board (e.g., at a distal end portion of second deck portion 108).

Headlight/taillight assemblies 180, 182 may be configured to reversibly light vehicle 100. For example, assemblies 180, 182 may indicate the direction that vehicle 100 is moving by changing color. For example, the headlight/taillight assemblies may each include one or more high output RGB and/or red and white LEDs (or other suitable one or more illuminators) configured to receive data from microcontroller 174 (and/or a pitch sensor or other sensors, such as a 3-axis gyro(s) 186 or accelerometer(s) 188) and automatically change color (e.g., from red to white, white to red, or a first color to a second color) based on the direction of movement of vehicle 100. The first color shines in the direction of motion and the second color shines backward (e.g., opposite the direction of motion). For example, one or more of the headlight/taillight assemblies (e.g., their respective illuminators) may be coupled to microcontroller 174 via an LED driver, which may be included in or connected to motor controller 166.

In some embodiments, the illuminators of assemblies 180, 182 may include RGB/RGBW LEDs. In a preferred embodiment, each LED is individually addressable, such that user adjustment of lighting color is permitted. Additional functionality, such as turn signal indication/animation and/or vehicle state information (e.g., battery state, operational vs. disabled by interlock, etc.) may also be provided.

Vehicle 100 may also include a power supply status indicator, specifically a battery indicator comprising one or more illuminators (e.g., LEDs) disposed within a housing of motor controller 166. The battery indicator may include any suitable illuminator(s) configured to indicate a state of power supply 164, e.g., by way of a signal provided to the battery indicator by the microcontroller and/or directly or indirectly from the power supply. The battery indicator is viewable by a rider, e.g., during operation of the vehicle, through an aperture or slot formed in an upper side of one of the foot pads.

In some examples, the battery indicator is an LED strip visible to the rider. Seven illuminators may be provided, using RGB-capable LED lights, although more or fewer may be utilized. The LED strip is programmable, and configured to display a battery state of charge as a bar graph and/or by a color (e.g., starts green when fully charged, goes through yellow, to red when nearing full discharge). The LED strip may also flash error codes, display status of footpad zone activation (i.e., via rider detection system 168), display alerts/alarms, blink code warnings, and/or the like. In some examples, LED behavior may be programmed to disappear while riding and only fade back in when stopped (or below a threshold speed). This mode of operation prevents the rider from looking down while riding. One or more of the above-described modes may be remotely selectable by a user. In some examples, the modes and, for example, a brightness adjustment, may be controllable from a software application running on a user's smartphone or other mobile device. In some examples, brightness may be based on either absolute brightness setting, or some other variable, e.g., a time of day adjustment (dimmer at night).

B. Illustrative Control System

FIG. 9 is a block diagram of various illustrative electrical components of vehicle 100, including onboard controls, some or all of which may be included in the vehicle. The electrical components may include a power supply management system 300 having a battery management system (BMS), a direct current to direct current (DC/DC) converter 302, a brushless direct current (BLDC) drive logic 304, a power stage 306, one or more 3-axis accelerometers 188, one or more 3-axis gyros 186, one or more Hall sensors 308, and/or a motor temperature sensor 310. DC/DC converter 302, BLDC drive logic 304, and power stage 306 may be included in and/or coupled to motor controller 166. In some examples, motor controller 166 may comprise a variable-frequency drive and/or any other suitable drive. Gyro(s) 186 and accelerometer(s) 188 may be included in sensors 176.

Active balancing (or self-stabilization) of the electric vehicle may be achieved through the use of a feedback control loop or mechanism. The feedback control mechanism may include sensors 176, which may be electrically coupled to and/or included in motor controller 166. Preferably, the feedback control mechanism includes a Proportional-Integral-Derivative (PID) control scheme using one or more gyros (e.g., gyro(s) 186) and one or more accelerometers (e.g., accelerometer(s) 188). Gyro 186 may be configured to measure a pivoting of the foot deck about its pitch axis. Gyro 186 and accelerometer 188 may be collectively configured to estimate (or measure, or sense) a lean angle of board 102, such as an orientation of the foot deck about the pitch, roll and/or yaw axes. In some embodiments, gyro 186 and accelerometer 188 may be collectively configured to sense orientation information sufficient to estimate the lean angle of frame 104 including pivotation about the pitch, roll and/or yaw axes.

As mentioned above, orientation information of board 102 may be measured (or sensed) by gyro 186 and accelerometer 188. The respective measurements (or sense signals) from gyro 186 and accelerometer 188 may be combined using a complementary or Kalman filter to estimate a lean angle of board 102 (e.g., pivoting of board 102 about the pitch, roll, and/or yaw axes, with pivoting about the pitch axis corresponding to a pitch angle (about axle 126), pivoting about the roll axis corresponding to a roll or heel-toe angle, and pivoting about the yaw axis corresponding to a side-to-side yaw angle) while filtering out the impacts of bumps, road texture and disturbances due to steering inputs. For example, gyro 186 and accelerometer 188 may be connected to microcontroller 174, which may be configured to correspondingly measure movement of board 102 about and/or along the pitch, roll, and/or yaw axes.

Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. Additional accelerometer and gyro axes may allow improved performance and functionality, such as detecting if the board has rolled over on its side or if the rider is making a turn.

The feedback control loop may be configured to drive motor 144 to reduce an angle of board 102 with respect to the ground. For example, if a rider were to angle board 102 downward, so that first deck portion 106 was 'lower' than second deck portion 108 (e.g., if the rider pivoted board 102 counterclockwise (CCW) about axle 126 in FIG. 2), then the feedback loop may drive motor 144 to cause CCW rotation of tire 114 about the pitch axis (i.e., axle 126) and a clockwise force on board 102.

Thus, motion of the electric vehicle may be achieved by the rider leaning his or her weight toward a selected (e.g., "front") foot. Similarly, deceleration may be achieved by the rider leaning toward the other (e.g., "back" foot). Regenerative braking can be used to slow the vehicle, as discussed further below. Sustained operation may be achieved in either direction by the rider maintaining their lean toward either selected foot.

As indicated in FIG. 9, microcontroller 174 may be configured to send a signal to brushless DC (BLDC) drive logic 304, which may communicate information relating to the orientation and motion of board 102. BLDC drive logic 304 may then interpret the signal and communicate with power stage 306 to drive motor 144 accordingly. Hall sensors 308 may send a signal to the BLDC drive logic to provide feedback regarding a substantially instantaneous rotational rate of the rotor of motor 144. Motor temperature sensor 310 may be configured to measure a temperature of motor 144 and send this measured temperature to logic 304. Logic 304 may limit an amount of power supplied to motor 144 based on the measured temperature of motor 144 to prevent the motor from overheating.

In some examples, microcontroller 174 (or another suitable portion of the control system) provides feedback to the user when an error is detected, the vehicle is operating in an unsafe condition, power supplied to motor 144 is about to be limited, the motor is at risk of overheating or overdrawing current, battery charge is low, and/or other potentially dangerous situations. For example, microcontroller 174 may provide haptic feedback (e.g., via a vibration motor within board 102), audible feedback (e.g., via a speaker within board 102), and/or visual feedback (e.g., via color changes and/or light patterns using illuminators 206). In some examples, feedback may be provided to the user via a mobile digital device such as a smartphone alert.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measured or estimated pitch angle of board 102).

Alternatively or additionally, some embodiments may include neural network control, fuzzy control, genetic algorithm control, linear-quadratic regulator control, state-dependent Riccati equation control, and/or other control algorithms. In some embodiments, absolute or relative encoders may be incorporated to provide feedback on motor position.

In some embodiments, a field-oriented control (FOC) or vector control system may be incorporated into the motor controller (e.g., in microcontroller 174, drive logic 304, and/or any other suitable processing logic of the motor controller). A suitable FOC system may be configured to divert excess regenerative current, thereby acting as a protective mechanism for the battery.

As mentioned above, during turning, the pitch angle can be modulated by the heel-toe angle (e.g., pivoting of the board about the roll axis), which may improve performance and prevent a front inside edge of board 102 from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of "carving" when turning, similar to the feel of carving a snowboard through snow or a surfboard through water.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., zero-degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

With continued reference to FIG. 9, the various electrical components may be configured to manage power supply 164. For example, the battery management system of power supply management system 300 is configured to protect batteries of power supply 164 from being overcharged, over-discharged, and/or short-circuited.

For example, a high voltage threshold may be instituted to stop and/or prevent charging at a selected battery charge percentage (e.g., 95%), and a low voltage threshold may be configured to stop discharging at a selected battery charge percentage (e.g., 5%). The high voltage threshold and low voltage threshold may be configured at the cell level, the battery pack level, or both. In some examples, the high voltage threshold allows more room for energy absorption via regenerative braking by limiting possible overcharging, such as when recently removed from the charger. By raising the low voltage threshold and reducing the high voltage threshold, the cycle life of the battery may be extended. The high voltage threshold and low voltage threshold may be selectively enabled and modified by the user, e.g., through a networked device such as a user's mobile digital device (e.g., smart phone).

System 300 may monitor battery health, may monitor a state of charge in power supply 164, and/or may increase the safety of the vehicle. Power supply management system 300 (AKA a battery charging system) may be connected between a user-accessible charge plug receptacle 172 (AKA charge port) of vehicle 100 and power supply 164. The rider (or other user) may couple a charger to plug receptacle 172 and re-charge power supply 164 via system 300.

Figure 2:
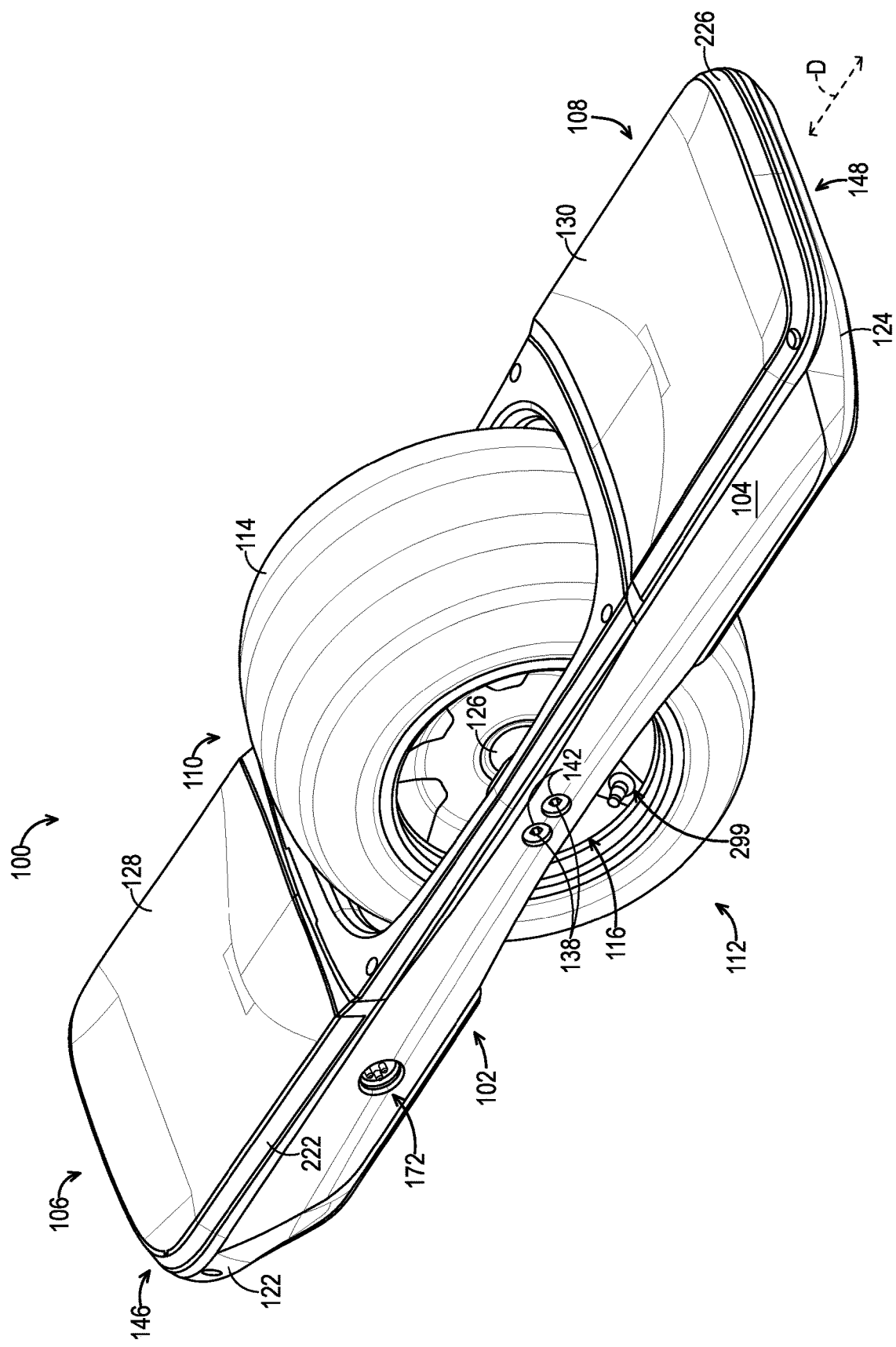
FIG. 2 is another isometric view of the skateboard of FIG. 1, taken from a different vantage point.
Figure 3:
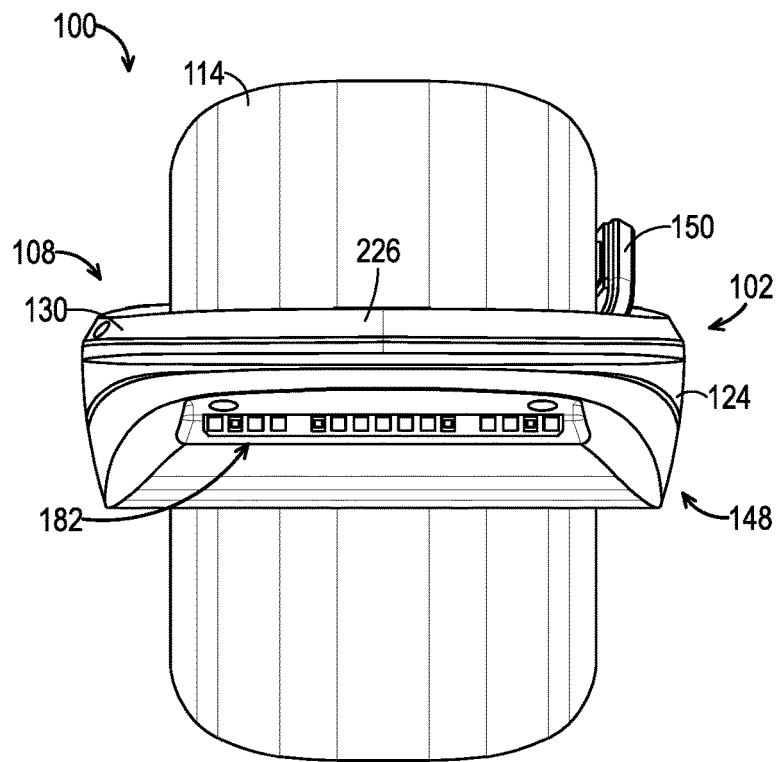
FIG. 3 is a first end elevation view of the skateboard of FIG. 1.
Figure 4:
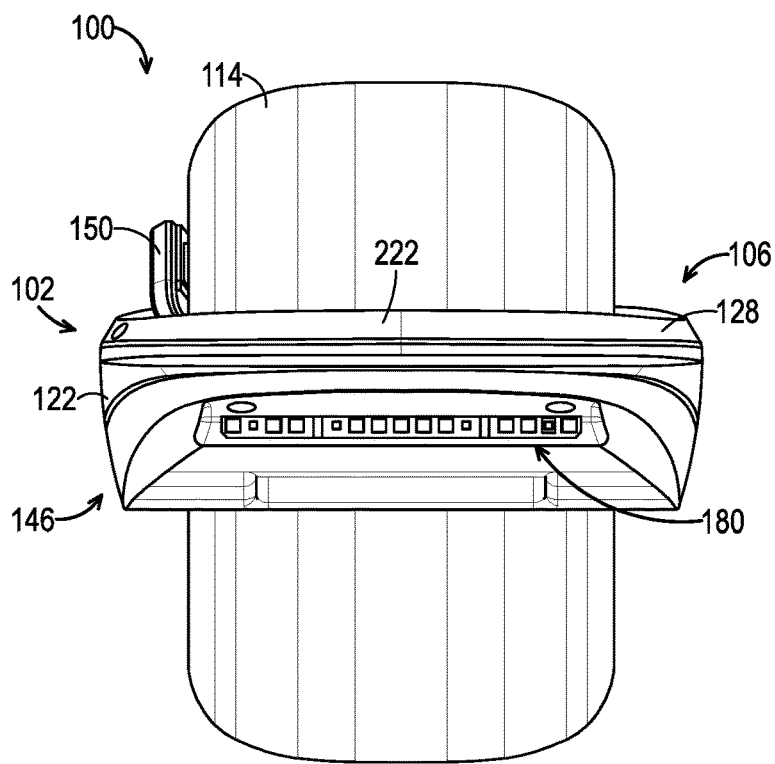
FIG. 4 is a second end elevation view of the skateboard of FIG. 1.
Figure 5:
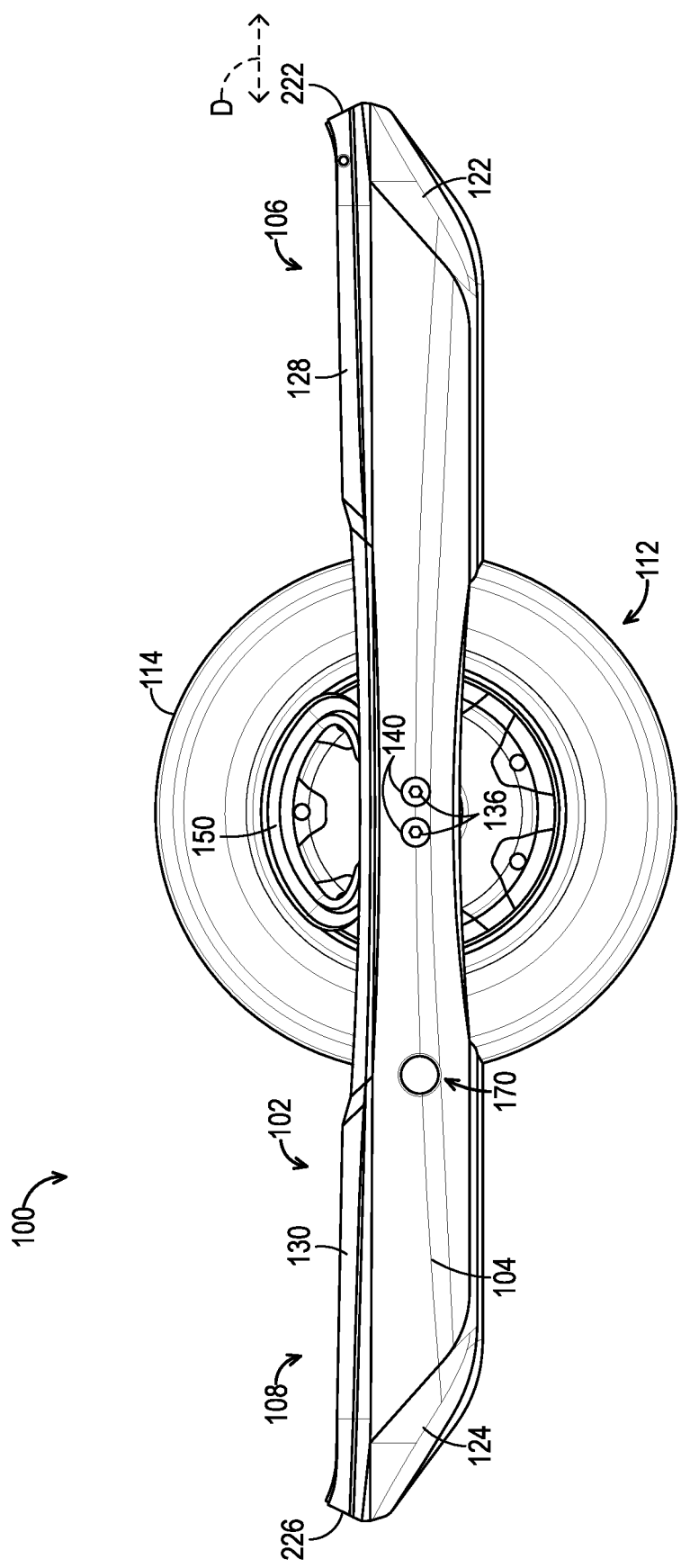
FIG. 5 is a first side elevation view of the skateboard of FIG. 1.
Figure 6:
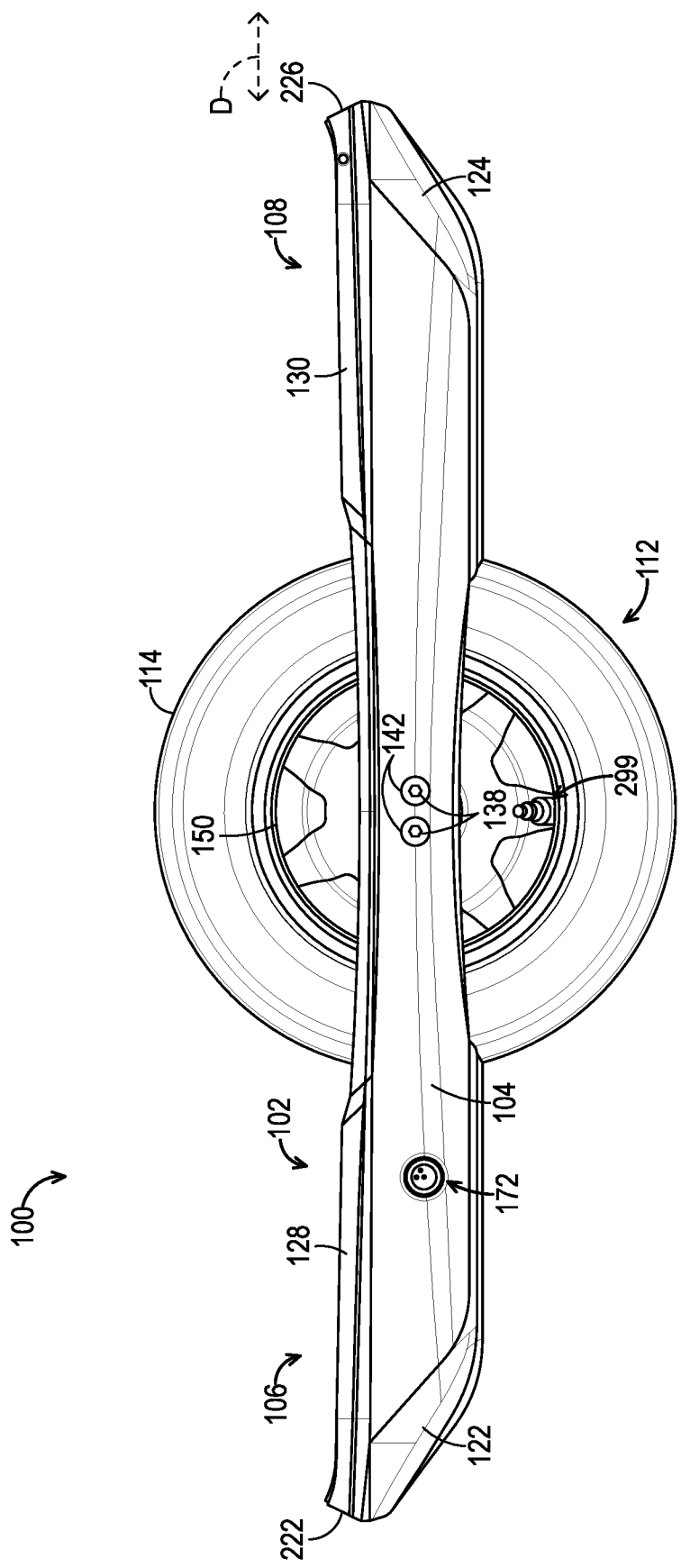
FIG. 6 is a second side elevation view of the skateboard of FIG. 1.
Figure 7:
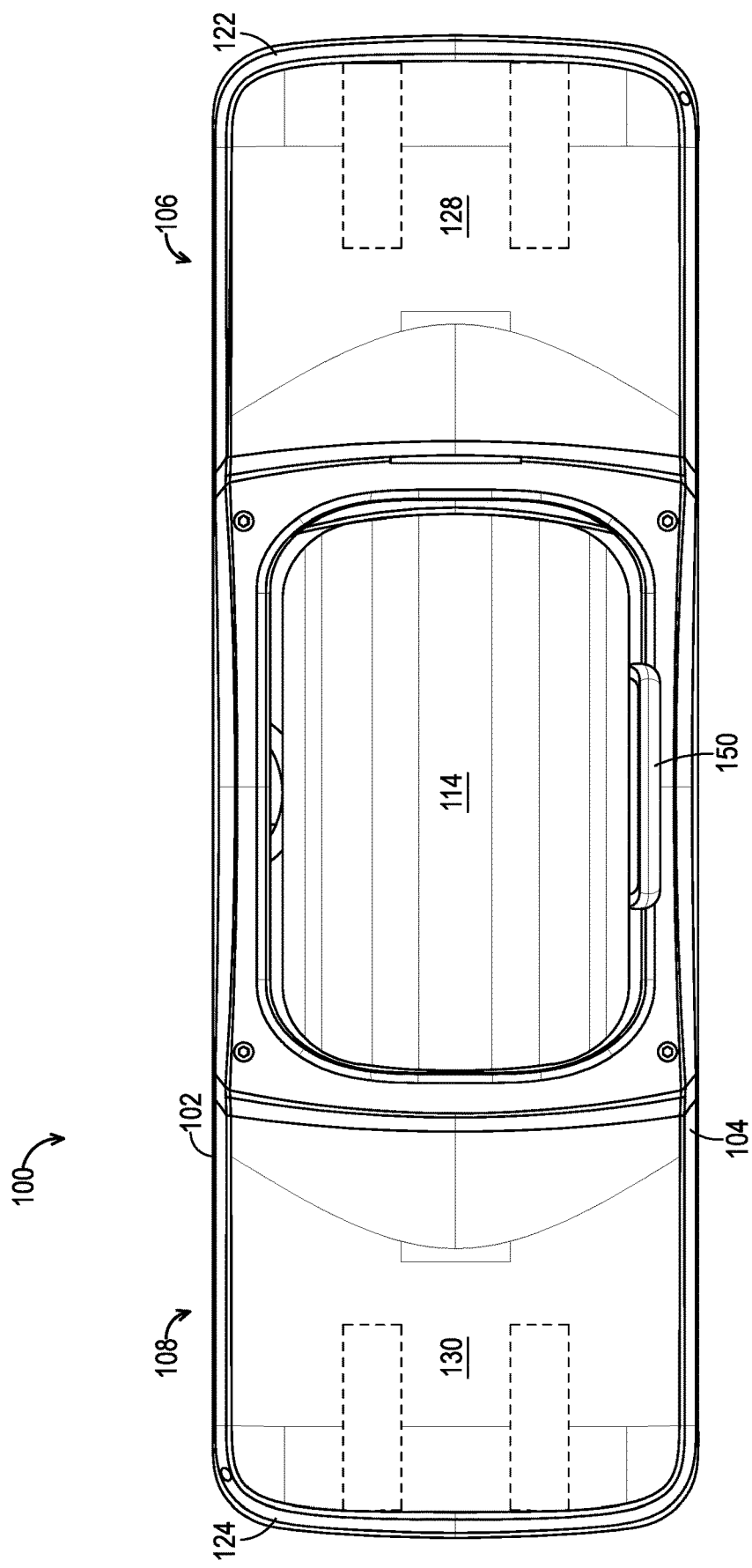
FIG. 7 is a top plan view of the skateboard of FIG. 1.
Figure 8:
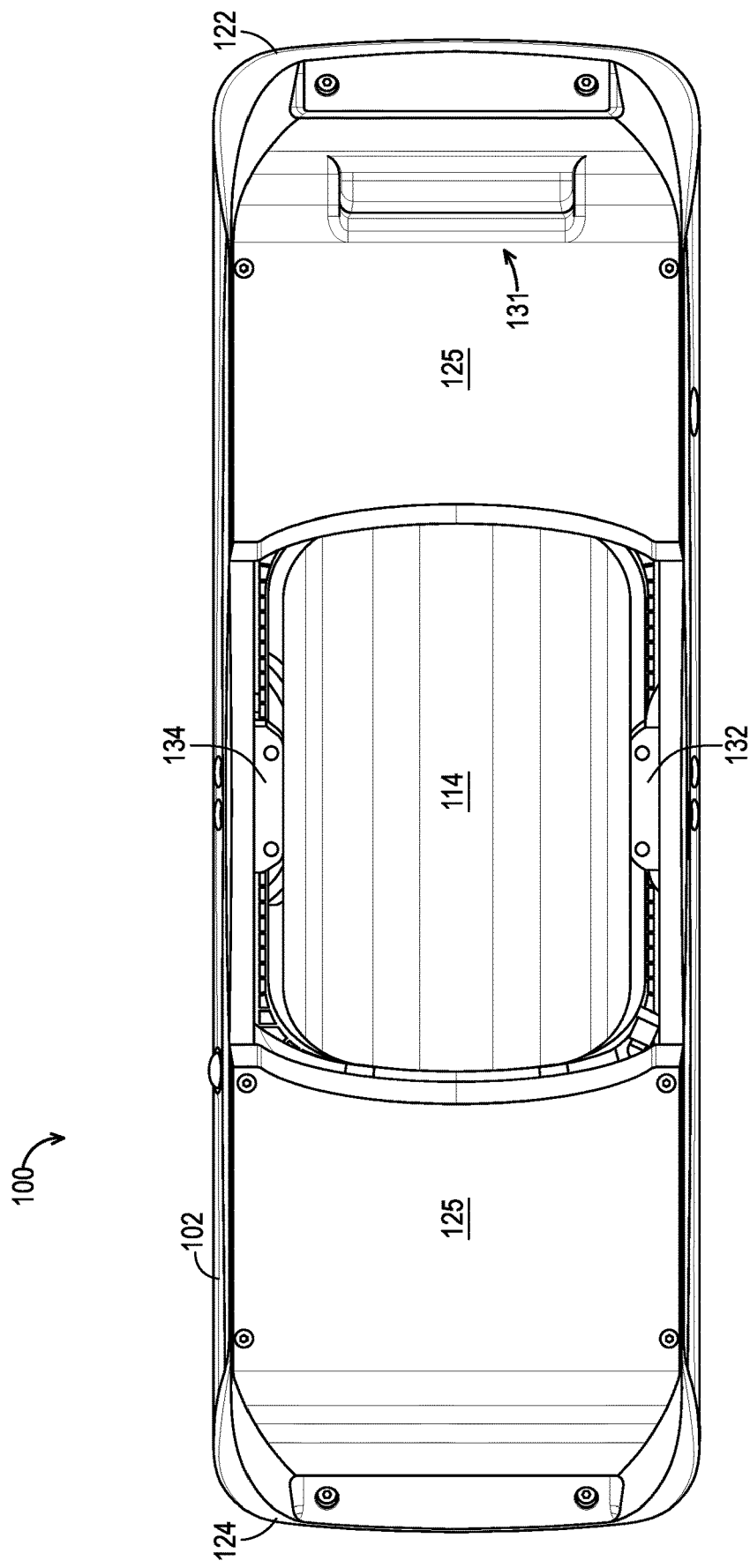
FIG. 8 is a bottom plan view of the skateboard of FIG. 1.

As shown in FIG. 2, charge receptacle 172 includes three electrical pins configured to mate with female connectors in a corresponding charging plug connectable to the charging port. The three pins include a ground pin, an input pin, and a third pin (AKA the identification (ID) pin). The charging plug may be a component of an external charging circuit, e.g., comprising an alternating current (AC) to direct current (DC) converter (AKA adapter) that receives AC power from a standard home outlet or the like.

The external charging circuit is configured to communicate an identification (ID) signal to the ID pin of the charging port. Accordingly, the charging system of the vehicle receives the identification signal via the third pin, and selectively enables charging of the battery based on the received identification signal. In other words, to enable charging of the rechargeable battery, system 300 (or the BMS of system 300) checks that the signal applied to the ID pin matches a known, expected value (or series of values and/or timing of the series of values). In some examples, the identification signal is a specific voltage, current, or both. System 300 therefore confirms legitimacy of the charger by confirming that the correct identification signal has been applied to the ID pin.

In some examples, the correct (i.e., expected) ID signal varies with respect to time. For example, the correct ID signal may change according to a known sequence of values, a known continuous function, or the like. In some examples, the ID signal utilizes a form of pulse width modulation, in which a selected value and duty cycle are expected by the BMS. For example, the external charging unit may provide an ID signal in pulses at regular or calculable intervals. The magnitude of the ID signal may be higher or lower than a background value, or the ID signal and the background may have overlapping values.

In operation, when an input voltage is detected on the input pin, the BMS checks for the identification signal on the third pin. If the ID signal matches the expected value, then the BMS enables charging of the vehicle. Otherwise, the BMS does not enable charging of the vehicle. In some examples, the charging circuit of the vehicle is disabled by default, with the BMS configured to enable the charging circuit of the vehicle only when a proper ID signal is present from the charger. In some examples, the BMS is configured to actively or affirmatively disable the charging circuit of the vehicle when a proper ID signal is absent.

Accordingly, a device for charging the battery of an electric vehicle (e.g., the external charging circuit) may include a first plug having three conductors, wherein the first plug is configured to mate with a three-conductor charging receptacle of an electric vehicle, and the three (e.g., female) conductors of the first plug include a direct current (DC) output conductor, a ground, and an identification signal conductor. The device may further include a second plug configured to mate with an alternating-current (AC) outlet, and an AC to DC converter configured to receive an AC current from the second plug and to provide a DC current to the first plug. Furthermore, the device may include a signal generator configured to produce an identification signal comprising a selected value (e.g., a voltage or electrical current magnitude) pulsed periodically in accordance with a selected duty cycle. The signal generator is further configured to provide the identification signal to the identification signal conductor of the first plug.

To begin operating the vehicle, power switch 170 may be activated (e.g., by the rider). Activation of switch 170 may send a power-on signal to converter 302. In response to the power-on signal, converter 302 may convert direct current from a first voltage level provided by power supply 164 to one or more other voltage levels. The other voltage levels may be different than the first voltage level. Converter 302 may be connected to the other electrical components via one or more electrical connections to provide these electrical components with suitable voltages.

Converter 302 (or other suitable circuitry) may transmit the power-on signal to microcontroller 174. In response to the power-on signal, microcontroller may initialize sensors 176, and rider detection device 168.

The electric vehicle may include one or more safety mechanisms, such as power switch 170 and/or rider detection device 168 to ensure that the rider is on the board before engaging the feedback control loop. In some embodiments, rider detection device 168 may be configured to determine if the rider's foot or feet are disposed on the foot deck, and to send a signal causing motor 144 to enter an active state when the rider's foot or feet are determined to be disposed on the foot deck.

Rider detection device 168 may include any suitable mechanism, structure, or apparatus for determining whether the rider is on the electric vehicle. For example, device 168 may include one or more mechanical buttons, one or more capacitive sensors, one or more inductive sensors, one or more optical switches, one or more force-resistive sensors, and/or one or more strain gauges. Rider detection device 168 may be located on or under either or both of first and second deck portions 106, 108 or may be integrated into footpad assemblies 400, as described further below. In some examples, the one or more mechanical buttons or other devices may be pressed directly (e.g., if on the deck portions), or indirectly (e.g., if under the deck portions), to sense whether the rider is on board 102. In some examples, the one or more capacitive sensors and/or the one or more inductive sensors may be located on or near a surface of either or both of the deck portions, and may correspondingly detect whether the rider is on the board via a change in capacitance or a change in inductance. In some examples, the one or more optical switches may be located on or near the surface of either or both of the deck portions. The one or more optical switches may detect whether the rider is on the board based on an optical signal. In some examples, the one or more strain gauges may be configured to measure board or axle flex imparted by the rider's feet to detect whether the rider is on the board. In some embodiments, device 168 may include a hand-held "dead-man" switch.

If device 168 detects that the rider is suitably positioned on the electric vehicle, then device 168 may send a rider-present signal to microcontroller 174. The rider-present signal may be the signal causing motor 144 to enter the active state. In response to the rider-present signal (and/or the board being moved to the level orientation), microcontroller 174 may activate the feedback control loop for driving motor 144. For example, in response to the rider-present signal, microcontroller 174 may send board orientation information (or measurement data) from sensors 176 to logic 304 for powering motor 144 via power stage 306.

In some embodiments, if device 168 detects that the rider is no longer suitably positioned or present on the electric vehicle, device 168 may send a rider-not-present signal to microcontroller 174. In response to the rider-not-present signal, circuitry of vehicle 100 (e.g., microcontroller 174, logic 304, and/or power stage 306) may be configured to reduce a rotational rate of the rotor relative to the stator to bring vehicle 100 to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive motor 144 even though the rider may not be present on the vehicle (e.g., temporarily), which may allow the rider to perform various tricks. For example, device 168 may be configured to delay sending the rider-not-present signal to the microcontroller for a predetermined duration of time, and/or the microcontroller may be configured to delay sending the signal to logic 304 to cut power to the motor for a predetermined duration of time.

C. Illustrative Footpad Assembly

As shown in FIGS. 10-25, this section describes an illustrative footpad assembly 400. Footpad assembly 400 may be utilized with electric vehicle 100, described above. For example, footpad assembly 400 may form a portion of first and/or second deck portions 106, 108 of electric vehicle 100, described above.

Figure 10:
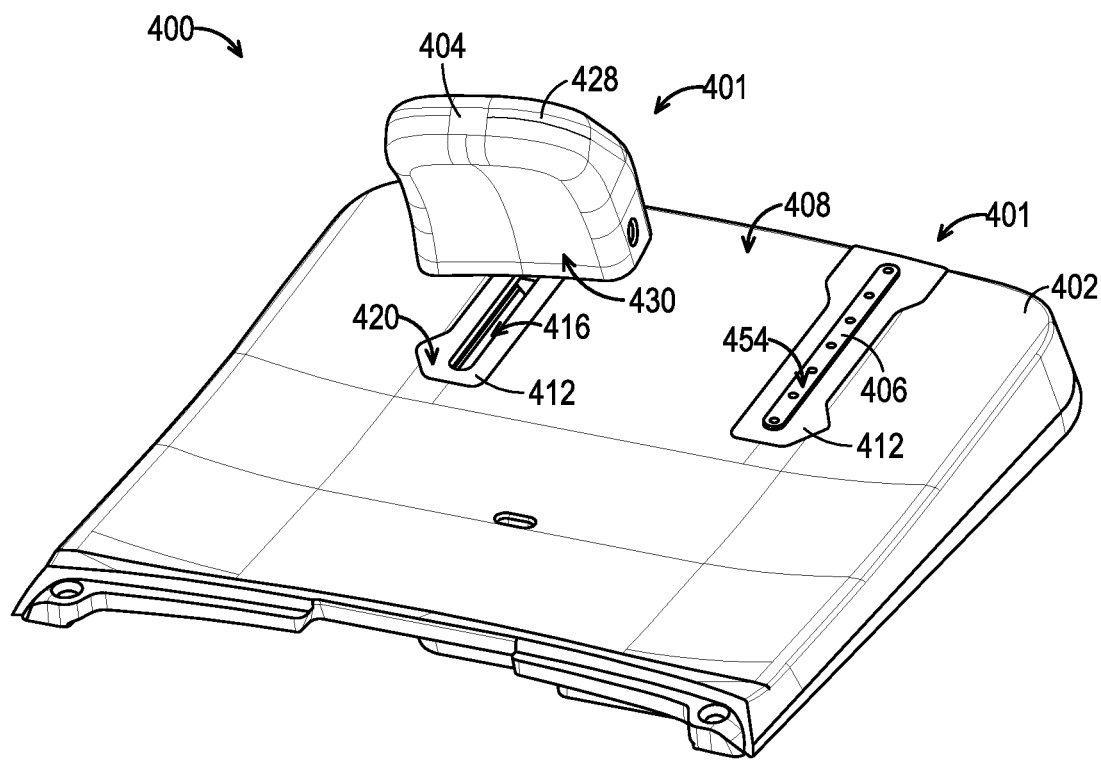
FIG. 10 is an isometric view of an illustrative footpad assembly in accordance with aspects of the present disclosure.
Figure 11:
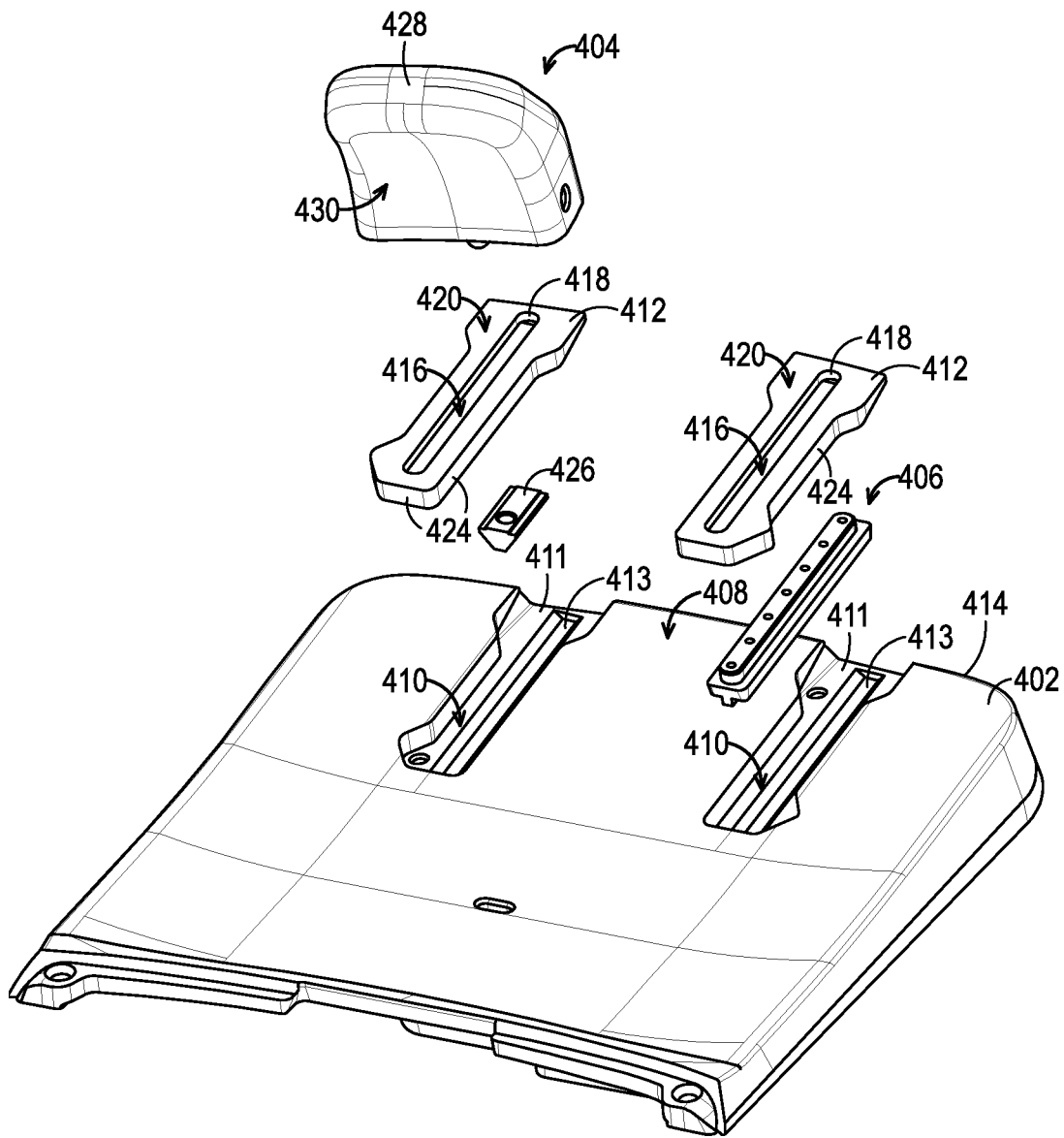
FIG. 11 is a first partially exploded view of the footpad assembly of FIG. 10.
Figure 12:
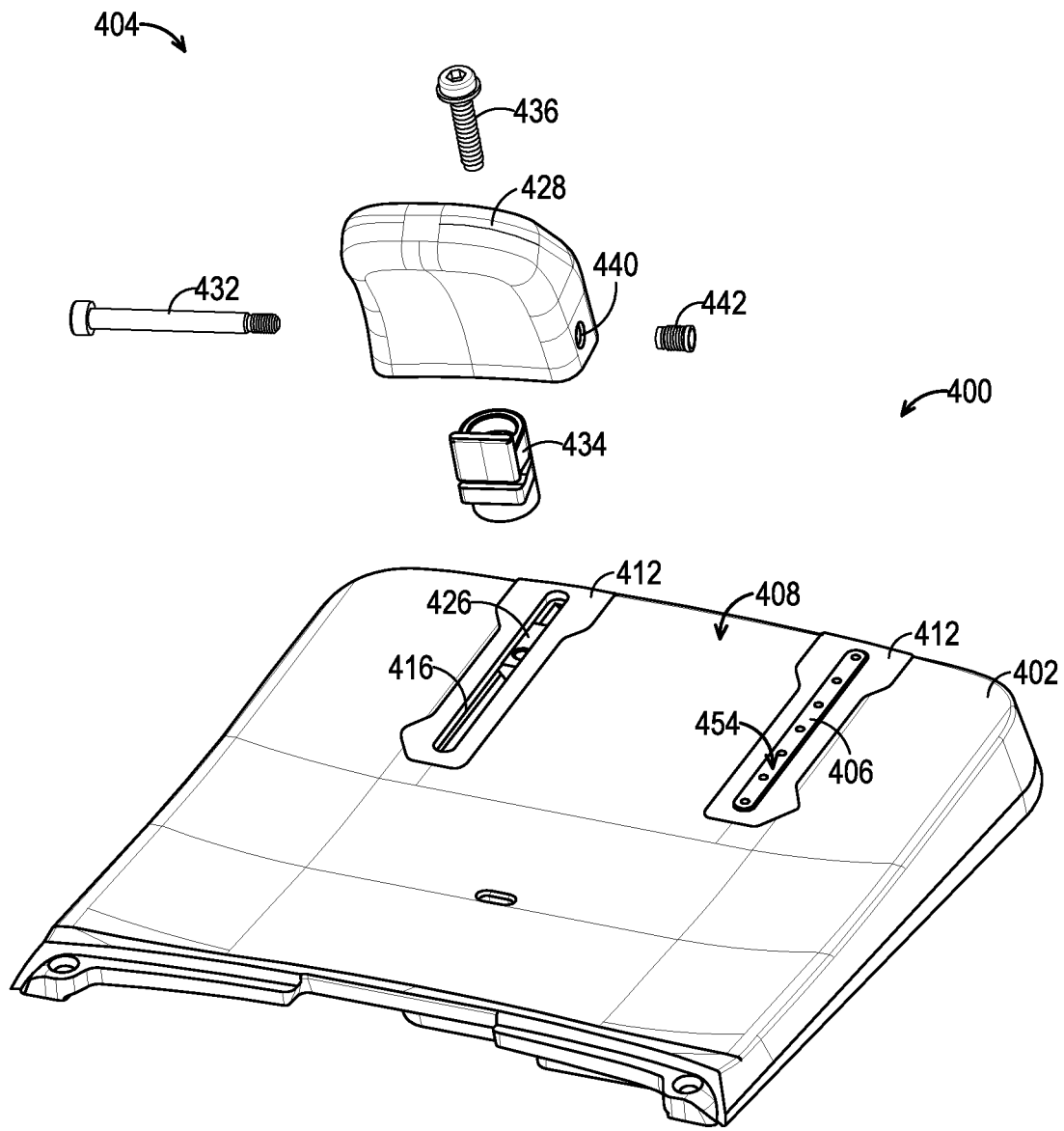
FIG. 12 is a second partially exploded view of the footpad assembly of FIG. 10.

As shown in FIGS. 10-12, footpad assembly 400 includes a footpad 402 and at least one foot engagement structure 401 (AKA foot engagement member), e.g., a foot stop 404 and/or a traction member 406, operatively coupled to the footpad. In some examples, footpad 402 is configured to be coupled to a frame of an electric vehicle, e.g., frame 104 of self-balancing electric skateboard 100, using one or more screws, bolts, and/or any other suitable fasteners. Footpad 402 is configured to receive a rider's right or left foot. Footpad 402 has an upper surface 408 which may have any suitable curvature, profile, and/or topography configured to receive the rider's foot. For example, upper surface 408 may have a concave-up profile, as shown in FIGS. 10-12.

As shown in FIG. 11 depicting a partially exploded view of footpad assembly 400, footpad 402 includes a pair of recesses 410 (AKA depressions, channels) defined in upper surface 408 of the footpad. Each recess 410 comprises an open recess or open channel having no ceiling or top/upper wall. Each recess 410 is configured to receive a respective insert 412 (AKA track, slotted insert), such that an upper wall 420 of the insert is exposed to a rider's foot. Inserts 412 are configured to be coupled to foot engagement structures 401 (e.g., foot stop 404 or traction member 406), as described further below.

Footpad 402 is depicted having two generally parallel recesses 410, however footpad 402 may have any suitable number of recesses 410 each configured to receive a respective one of inserts 412. In some examples, each recess 410 includes an elongate groove 413 formed in a floor or bottom wall 411 of recess 410. Elongate groove 413 may be configured to receive and guide a slot nut 426 that is received in the T-slot formed by insert 412, as described further below.

Recesses 410 and inserts 412 have matching planforms to facilitate recesses 410 receiving inserts 412. Recesses 410 and inserts 412 may have any suitable shapes, sizes, and/or planforms and recesses 410 may be disposed and/or oriented at any suitable positions with respect to footpad 402. In some examples, as shown in FIG. 11, recesses 410 have an elongate planform extending longitudinally across a portion of upper surface 408. In the example of FIG. 11, recesses 410 extend inward from a distal edge 414 of upper surface 408. Recesses 410 and inserts 412 may be disposed on footpad 402 at select positions of footpad to facilitate positioning foot engagement member 404, 406 at a desired position to contact the rider's foot. For example, recesses 410 and inserts 412 may be positioned to facilitate foot engagement members 404, 406 being positioned to contact an outer side portion of the rider's foot. When assembled, as shown in FIG. 10, each insert 412 is disposed in a respective recess 410 and coupled to footpad 402. Inserts 412 may be coupled to footpad 402 in any suitable manner, e.g., utilizing one or more bolts, screws, and/or other suitable (e.g., reusable) fasteners. Inserts 412 are secured to footpad 402, such that inserts 412 are prevented from moving within or with respect to recesses 410.

Inserts 412 may comprise any suitable materials configured to be operatively coupled to the one or more foot engagement members 401 and to distribute forces applied to the one or more foot engagement members to the footpad. For example, inserts 412 may comprise a metal (e.g., aluminum, steel). In some examples, inserts 412 comprise a different material than footpad 402. For example, footpad 402 may comprise one or more of a thermoplastic polymer and/or a resilient foam or rubber material and inserts 412 may comprise the metal. Inserts 412 may comprise any suitable rigid material configured to receive forces applied to foot engagement members 401 that are coupled to the inserts.

Figure 16:
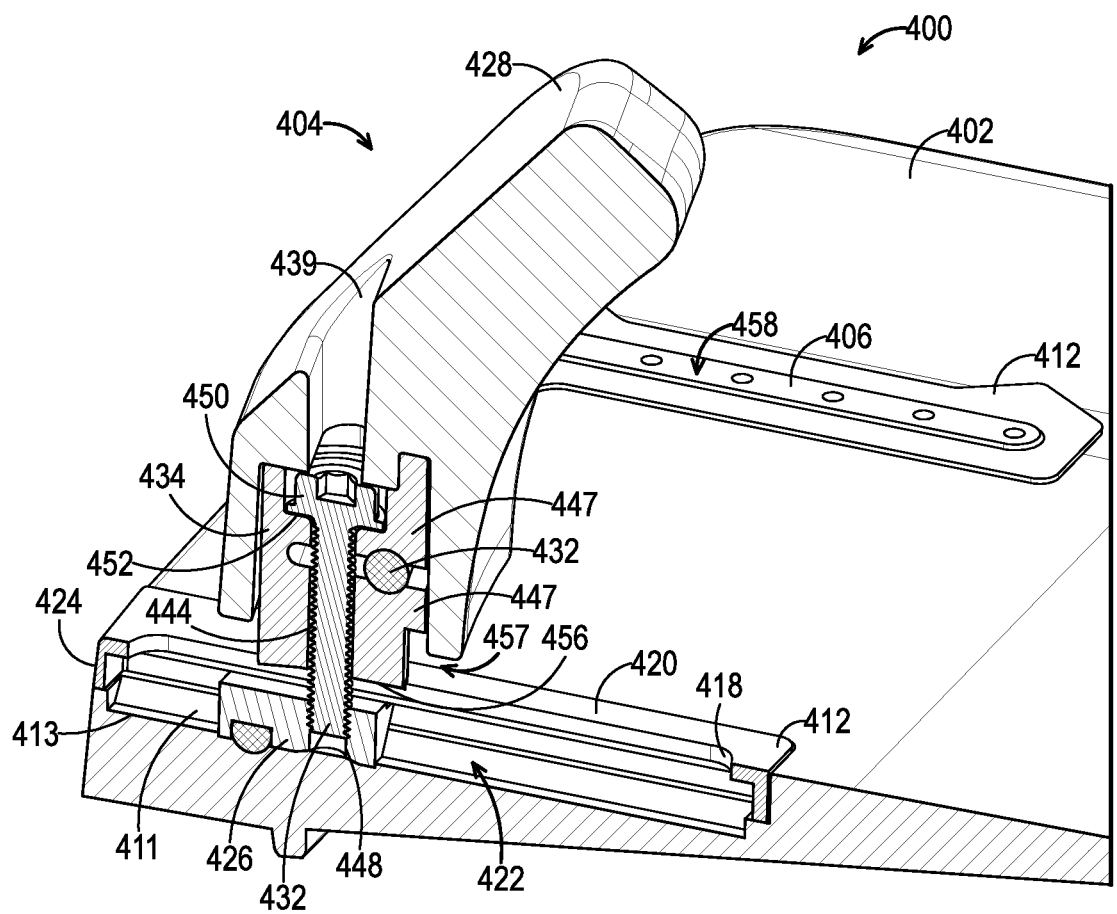
FIG. 16 is a cross-sectional view of the footpad assembly of FIG. 15 corresponding to line 16-16 in FIG. 15.

As shown in FIGS. 11 and 16, each insert 412 includes an upper wall 420 (AKA a top wall or ceiling) and a side wall 424 extending downward from upper wall 420. Insert 412 defines an internal cavity 416 between side walls 424 and upper wall 420. Internal cavity 416 extends longitudinally across a majority of insert 412. Internal cavity 416 is in communication with an elongate opening 418 or slot formed in upper wall 420. In some examples, the insert has no bottom wall (e.g., no floor) and internal cavity 416 is defined only by side walls 424 and the slotted upper wall 420 of insert 412 (in conjunction with the floor of recess 410, when installed). When insert 412 is disposed in recess 410, a slot 422 (AKA T-slot) is formed between upper wall 420 of insert 412 and bottom wall 411 (AKA floor) of recess 410. For example, upper wall 420 is spaced from floor 411 of recess 412 by side wall 424 extending downward from the periphery of upper wall 420 to form T-slot 422. In some examples, opening 418 has a first width that is less than a second width of T-slot 422 and internal cavity 416. This facilitates retaining components (e.g., slot nut 426 or traction member 406) within T-slot 422, e.g., sandwiched between insert 412 and the bottom wall of recess 410, while permitting the components to interact with the external environment through elongate opening 418 in upper wall 420 of insert 412.

One or more foot engagement members 401 are configured to be operatively coupled to each insert 412. Foot engagement members 401 may comprise any suitable structures configured to contact the rider's foot and at least partially retain, restrain, and/or block the rider's foot, to prevent undesired movement of the rider's foot in a particular direction during use, and/or to provide added traction to reduce slipping of the rider's foot on the footpad. For example, foot engagement members 401 may comprise a foot stop 404 coupled to insert 412 and extending above upper surface 408 of footpad 402. Foot stop 404 is configured to contact a side portion or upper portion of the rider's foot. In some examples, foot engagement members 401 comprise a traction member 406 configured to be received within T-slot 422 of insert 412 (e.g., between insert 412 and bottom wall 411 of recess 410) and to contact a bottom side (e.g., a sole) of the rider's foot (e.g., a shoe on the foot) through opening 418 in the upper surface of insert 412.

Each insert 412 may be configured to receive any suitable foot engagement structure 401, e.g., foot stop 404 or traction member 406. This facilitates a user customizing footpad 402 according to their preferences by choosing which foot engagement members (e.g., foot stop 404 or traction member 406) to couple to which insert 412 of footpad 402. In the example of FIGS. 10-12, footpad 402 includes foot stop 404 coupled to the insert disposed on the left side of the footpad and a traction member 406 coupled to the insert disposed on the right side of the footpad. However, a user may choose to couple a foot stop 404 to each of the inserts, a traction member 406 to each of the inserts, or any other suitable combination of the foot engagement members to the respective inserts 412.

Foot stop 404 may comprise any suitable structures configured to abut, engage, and/or contact the rider's foot and prevent undesired movement of the rider's foot during use. For example, foot stop 404 may comprise a rigid body 428 configured to extend above upper surface 408 of footpad 402. Rigid body 428 comprises a foot engagement surface 430 configured to contact or abut the side portion or upper portion of the rider's foot. In some examples, rigid body 428 includes a curved foot engagement surface 430 configured to contact and at least partially conform to a side profile or contour of the rider's foot. In some examples, foot engagement surface 430 of rigid body 428 is flat. FIGS. 19-23 depict non-limiting examples of rigid bodies 428 of foot stops 404 in accordance with the present disclosure. However, rigid bodies 428 of foot stops 404 may have any suitable shapes, sizes, and/or foot engagement surfaces 430.

Rigid body 428 of foot stop 404 may comprise any suitable materials configured to engage and prevent undesired movement of the rider's foot. For example, rigid body 428 may comprise a thermoplastic polymer and/or any other suitable rigid base material. In some examples, rigid body 428 includes a resilient material 429 overmolded onto at least a portion of the rigid base material. For example, rigid body 428 may include a rubber material overmolded onto a thermoplastic base material. In some examples, the resilient material is overmolded onto at least a portion of foot engagement surface 430 of rigid body 428 to facilitate improved grip between foot engagement surface 430 and the rider's foot.

Foot stop 404 may be coupled to insert 412 in any suitable manner, such that a position and rotational orientation of foot stop 404 is configured to be selectively adjusted by a user. For example, foot stop 404 may be removably coupled to a slot nut 426 disposed in T-slot 422 disposed between insert 412 and bottom wall 411 of recess 410. As shown in FIGS. 11 and 16, slot nut 426 is disposed entirely within T-slot 422 between insert 412 and bottom wall 411 of recess 410. In other words, when assembled, slot nut 426 is sandwiched between insert 412 and bottom wall 411 of recess 410 and disposed entirely within T-slot 422.

Slot nut 426 is configured to be selectively translated along a length of T-slot 422. In some examples, slot nut 426 comprises a spring-loaded ball configured to retain the slot nut in a selected position within the slot when the spring is expanded and to permit the selective translation of the slot nut within the slot when the spring is compressed. This facilitates adjustment of the position of the slot nut within slot as desired and prevents undesired translation of the slot nut during use. Slot nut 426 is configured to receive a portion of foot stop 404 and facilitate adjustably and removably coupling foot stop 404 to footpad 402. In other words, translating slot nut 426 in a longitudinal direction along the length of the slot adjusts a longitudinal position of foot stop 404 coupled to slot nut 426. In some examples, at least a portion of slot nut 426 is received in elongate groove 413 formed in bottom wall 411 of recess 410 and elongate groove 413 is configured to guide the translation of slot nut 426 along the length of T-slot 422.

Figure 13:
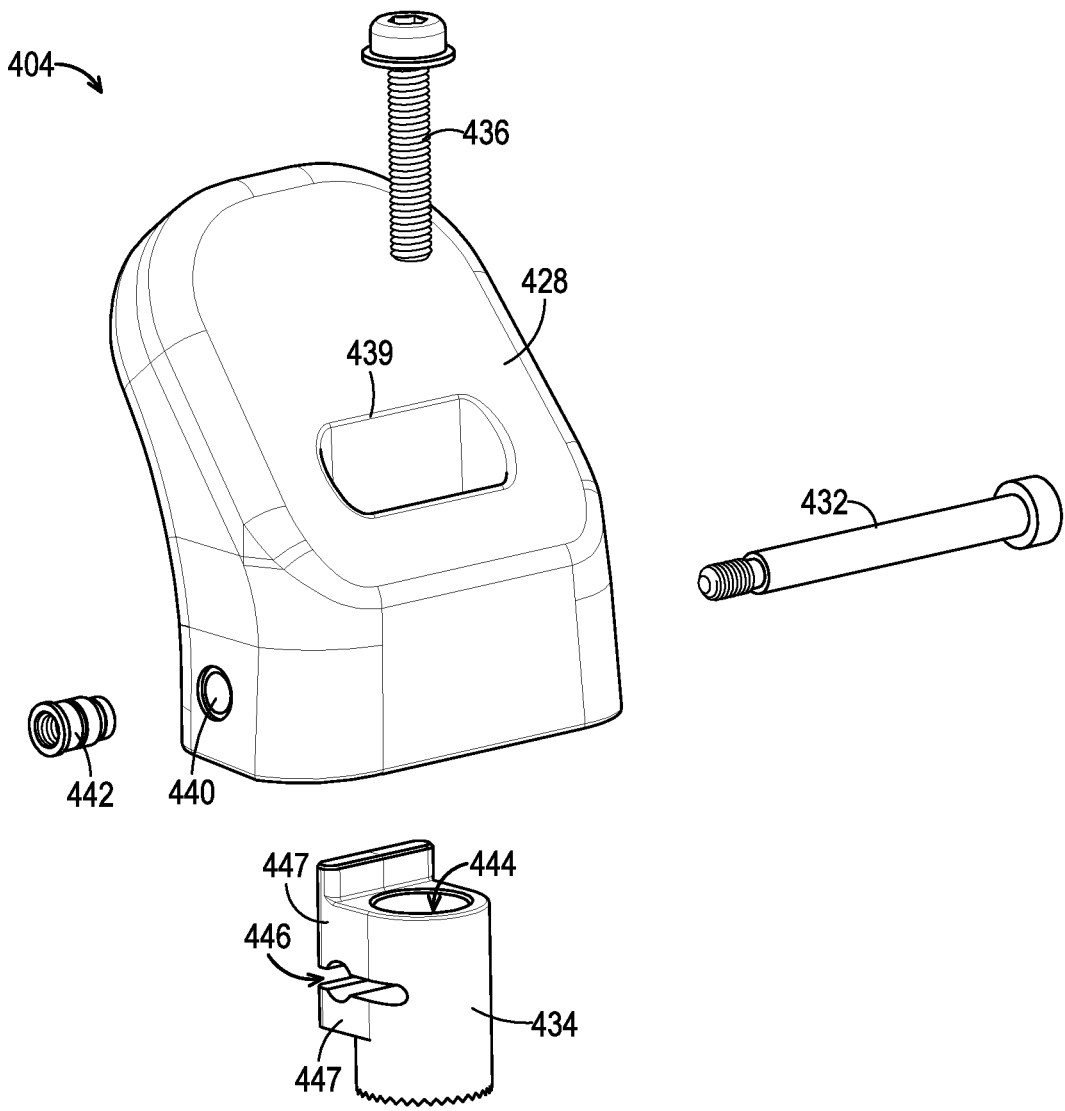
FIG. 13 is a first exploded view of a foot stop assembly for use with the footpad assembly of FIGS. 10-12.
Figure 14:
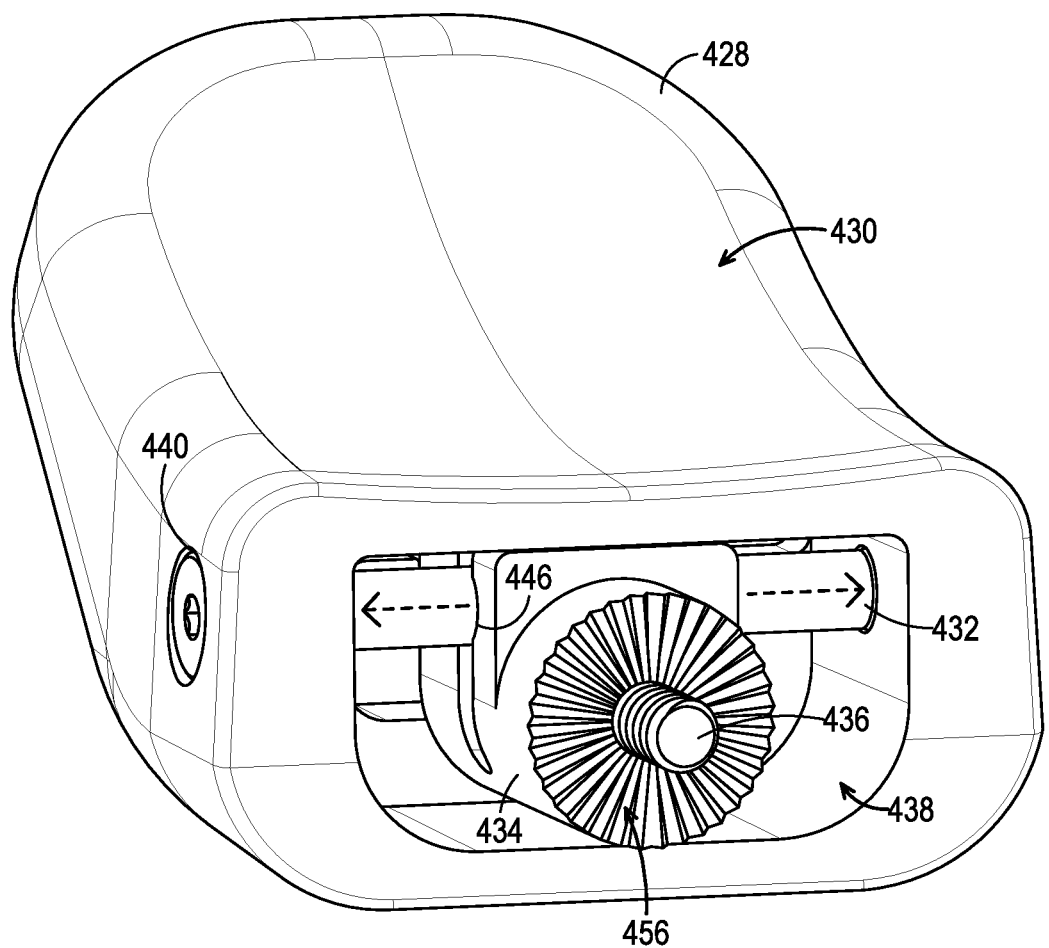
FIG. 14 is a bottom side view of the foot stop assembly of FIG. 13.

As shown in FIGS. 12-14 and 16, foot stop 404 may include a lateral adjustment rail 432 (AKA lateral adjustment bolt), a coupling member 434, and a locking bolt 436 configured to facilitate adjustably and removably coupling rigid body 428 of foot stop 404 to slot nut 426. Lateral adjustment rail 432 is fixed to rigid body 428 and extends laterally across rigid body 428. Lateral adjustment rail 432 is configured to facilitate selective lateral positioning of rigid body 428 relative to insert 412. As shown in FIG. 14, rigid body 428 may define a rigid-body internal cavity 438 and lateral adjustment rail 432 extends laterally across the rigid body through rigid-body internal cavity 438. Lateral adjustment rail 432 may be coupled to rigid body 428 in any suitable manner. For example, as shown in FIGS. 13 and 14, rigid body 428 may include a pair of apertures 440 formed in lateral sides of rigid body 428. A threaded insert 442 may be disposed in a first one of apertures 440 and lateral adjustment rail 432 may extend through a second one of apertures 440 to be coupled to threaded insert 442 via a threaded connection, such that lateral adjustment rail 432 is fixed to rigid body 428 in the position extending laterally across rigid body 428.

Coupling member 434 is configured to be coupled simultaneously to lateral adjustment rail 432 and to slot nut 426. Coupling member 434 includes a through-hole 444 configured to receive locking bolt 436 and a clamp 446 (AKA clamping portion) configured to engage and securely hold lateral adjustment rail 432. Clamp 446 may comprise any suitable structures configured to engage and securely hold lateral adjustment rail 432 and be tightened onto lateral adjustment rail 432 using locking bolt 436. In other words, a clamping pressure of clamping portion 446 is controlled by locking bolt 436. For example, clamp 446 may comprise a pair of clamp arms 447 configured to engage lateral adjustment rail 432, e.g., clamp arms 446 may be configured to clamp or pinch lateral adjustment rail 432 to secure coupling member 434 to lateral adjustment rail 432. In some examples, clamp arms 447 are configured to bend or flex towards each other to engage and pinch the lateral adjustment rail in response to a corresponding force applied by locking bolt 436. Coupling member 434 may comprise any suitable material configured to facilitate the bending or flexing of clamp arms 447 in response to a force applied by locking bolt 436.

Clamp 446 is configured to be selectively clamped to lateral adjustment rail 432 at a range of lateral positions along a length of lateral adjustment rail 432. Adjusting the lateral position at which clamp 446 engages and couples to lateral adjustment rail 432 adjusts a lateral position of rigid body 428 relative to slot nut 426 and insert 412, when coupling member 434 is coupled to slot nut 426.

Figure 15:
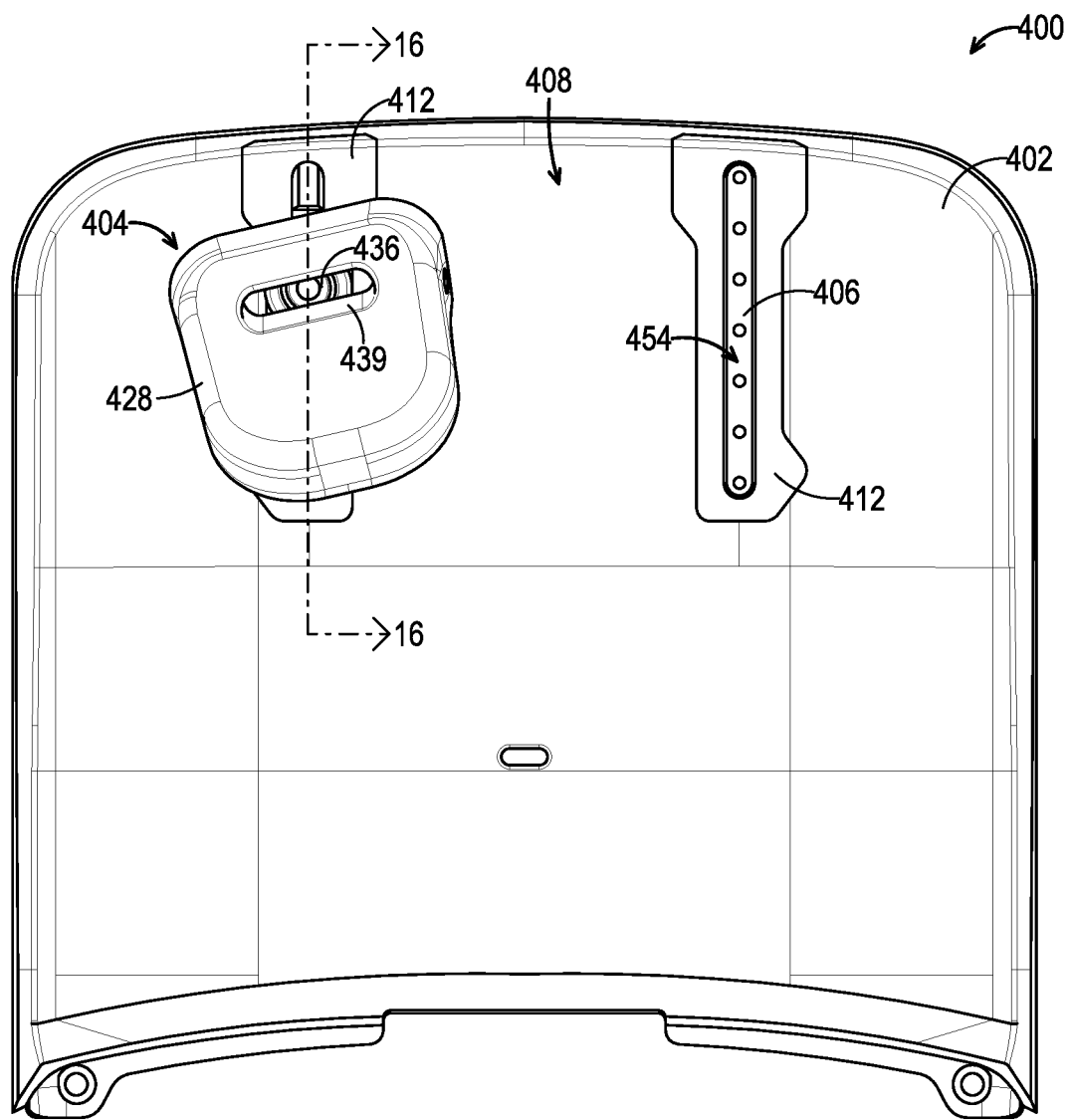
FIG. 15 is a top plan view of the footpad assembly of FIGS. 10-12.

FIG. 16 depicts a sectional view of foot stop 404 coupled to slot nut 426. As shown in FIG. 16, locking bolt 436 extends through through-hole 444 and is received by a threaded opening 448 of slot nut 426. Through-hole 444 includes a seat 452 configured to receive and engage a head portion 450 of locking bolt 436 and prevent locking bolt 436 from passing entirely through through-hole 444. Locking bolt 436 is secured to threaded opening 448 via a threaded connection between a threaded portion of locking bolt 436 and threaded opening 448. As a result, head portion 450 of locking bolt 436 applies a downward force on seat 452 of coupling member 434. This causes clamp arms 447 to engage lateral adjustment rail 432 and secures coupling member 434 to lateral adjustment rail 432. As shown in FIG. 15 depicting a top plan view of footpad 402, rigid-body internal cavity 438 is open to an external environment through an opening 439 formed in rigid body 428. This facilitates ease of access for a user to tighten or loosen locking bolt 436 by inserting a tool through opening 439.

When foot stop 404 is coupled to slot nut 426, as shown in FIG. 16, a portion of insert 412 is sandwiched and compressed between a bottom surface 456 of coupling member 434 and slot nut 426. This secures foot stop 404 to insert 412, such that foot stop 404 is prevented from moving relative to insert 412, when locking bolt 436 is secured to slot nut 426. In some examples, as shown in FIG. 14, bottom surface 456 of coupling member 434 is textured having a plurality of sipes, ridges, or knurling. In some examples, upper wall 420 of insert 412 has an upper surface that is textured and configured to engage textured bottom surface 456 of coupling member 434, when foot stop is coupled to slot nut 426. This facilitates preventing slipping or undesired movement of foot stop 404 during use.

As shown in FIG. 16, rigid body 428 may be spaced from upper wall 420 of insert 412 and adjacent portions of upper surface 408 of footpad 402 by a gap 457. Gap 457 is configured to provide sufficient clearance between rigid body 428 and the upper surfaces of the footpad and the insert to permit the adjustment of the position of the rigid body relative to the curved surfaces of the footpad. In other words, gap 457 prevents contact between rigid body 428 and the upper surfaces of the footpad and the insert, when rigid body 428 is repositioned relative to the curved upper surface of the footpad.

Prior to tightening locking bolt 436, coupling member 434 and rigid body 428 may be rotated to a desired rotational orientation and coupling member 434 may be positioned at a desired lateral position of lateral adjustment rail 432. Slot nut 426 may be translated along T-slot 422 to a position corresponding to a desired longitudinal position of rigid body 428 relative to footpad 402. Locking bolt 436 may then be coupled to slot nut 426 with rigid body 428 disposed at the desired longitudinal position, desired lateral position, and desired rotational orientation. In this manner, a longitudinal position, lateral position, and rotational orientation of rigid body 428 is selectively adjustable by a user to position foot stop 404 in a desired position for riding.

Footpad assembly 400 includes traction member 406 coupled to one or more of inserts 412. Traction member 406 may comprise any suitable structures configured to provide added grip or traction for a rider's foot. For example, traction member 406 may have an upper surface 454 configured to engage a bottom side (e.g., a sole) of the rider's foot and prevent or reduce slipping and unwanted movement of the rider's foot on footpad 402. When assembled as shown in FIG. 10, upper surface 454 of traction member 406 may be generally coplanar (e.g., flush) with the upper surface of upper wall 420 of insert 412 and adjacent portions of upper surface 408 of footpad 402. In other words, traction member 406 may not be configured to extend substantially above upper surface 408 of footpad 402, e.g., does not extend more than an inch above the upper surfaces of insert 412 and footpad 402.

Figure 17:
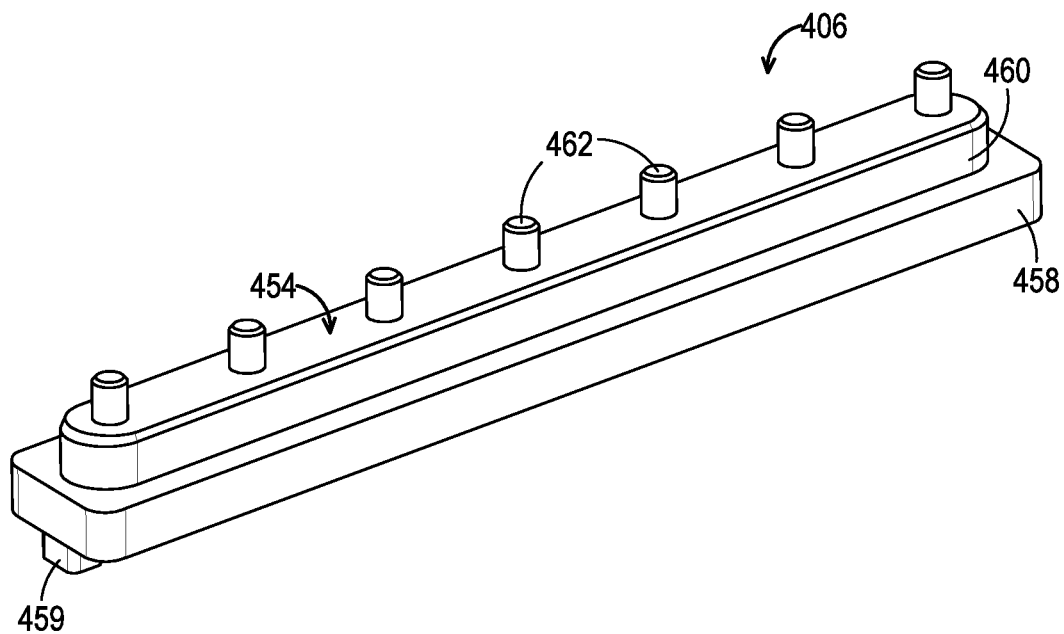
FIG. 17 is an isometric view depicting a first illustrative example of a traction insert in accordance with aspects of the present disclosure.
Figure 18:
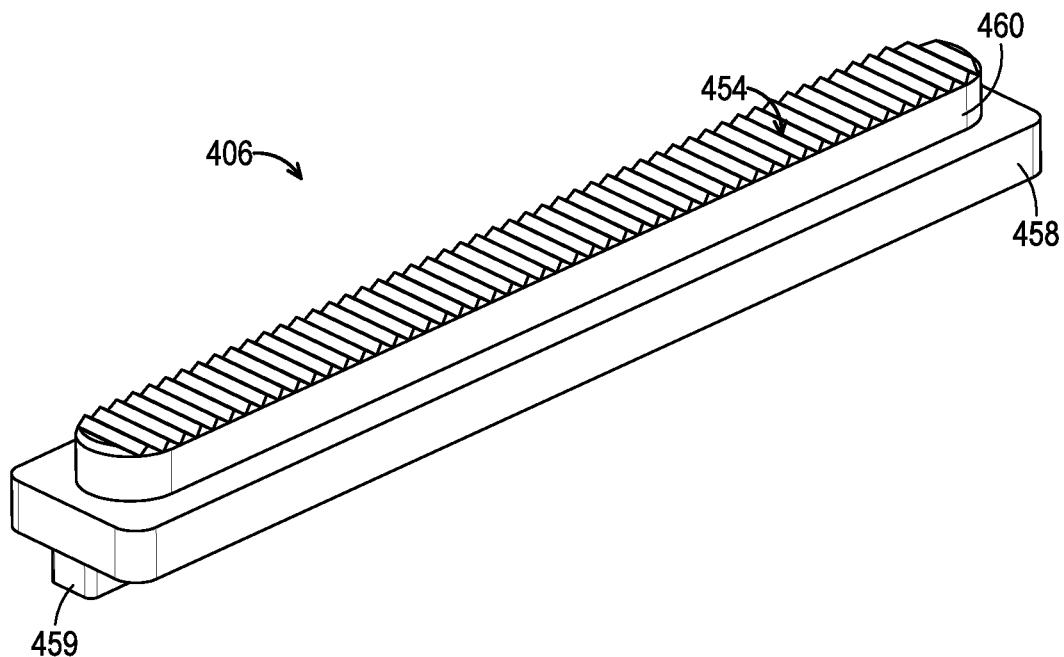
FIG. 18 is an isometric view depicting a second illustrative example of a traction insert.
Figure 19:
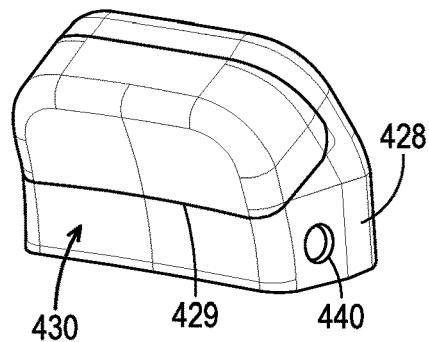
FIG. 19 is an isometric view depicting a first illustrative example of a foot stop in accordance with aspects of the present disclosure.
Figure 20:
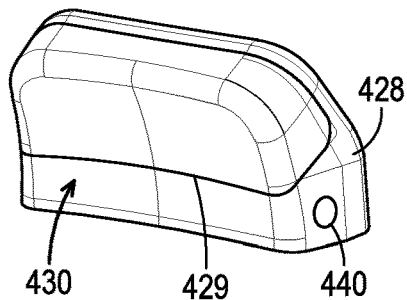
FIG. 20 is an isometric view depicting a second illustrative example of a foot stop.
Figure 21:
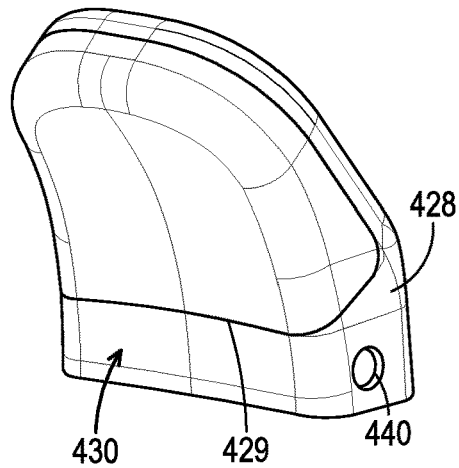
FIG. 21 is an isometric view depicting a third illustrative example of a foot stop.
Figure 22:
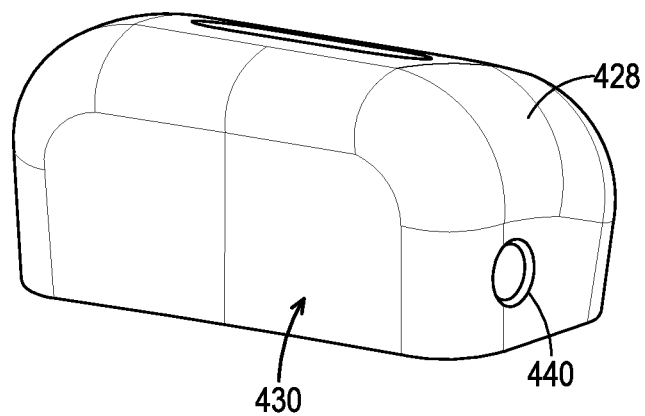
FIG. 22 is an isometric view depicting a fourth illustrative example of a foot stop.
Figure 23:
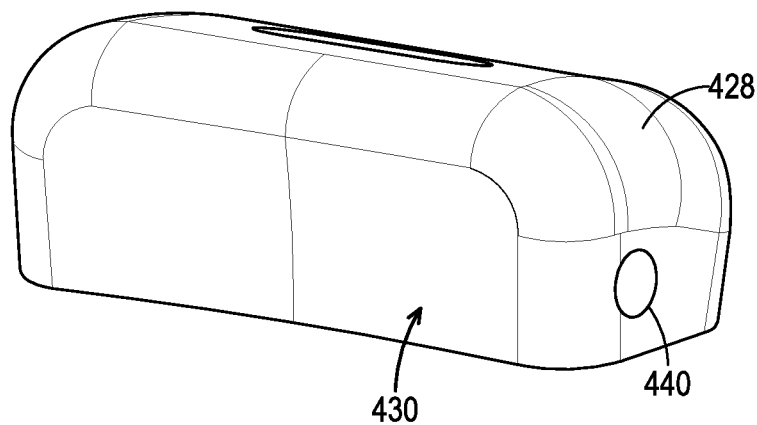
FIG. 23 is an isometric view depicting a fifth illustrative example of a foot stop.

In some examples, as shown in FIG. 11 and FIGS. 17-18, traction member 406 includes a base portion 458 and a protruding portion 460 extending upward from base portion 458. Base portion 458 is configured to be received in T-slot 422 and sandwiched between insert 412 and bottom wall of recess 410. In some examples, at least a portion of base portion 458 is received in elongate groove 413 in the floor of the recess. In other words, base portion 458 is seated in T-slot 422 and/or elongate groove 413. In some examples, base portion 458 includes one or more projections 459 extending downward from a bottom side of base portion 458. Downward projections 459 may be configured to be received in elongate groove 413 formed in the bottom wall of recess 410. In some examples, base portion 458 is sized and/or shaped to substantially fill a majority of T-slot 422. This facilitates traction member 406 being securely held in place between insert 412 and bottom wall of recess 410 without the use of fasteners to directly fasten traction member 406 to the insert or the recess.

Traction member 406 includes protruding portion 460 extending upward from base portion 458. Protruding portion 460 is configured to extend upward through elongate opening 418 in the upper surface of insert 412. In some examples, base portion 458 and protruding portion 460 are integral or monolithic. Base portion 458 has a first width which may match the first width of T-slot 422 and protruding portion 460 may have a second narrower width matching the narrower width of opening 418. This facilitates insert 412 retaining base portion 458 of traction member 406 between insert 412 and the bottom wall of recess 410 within T-slot 422.

Protruding portion 460 includes upper surface 454 of traction member 406 which is configured to engage the rider's foot. Upper surface 454 may have any suitable textured surface and/or features configured to provide traction or grip for a rider's foot. For example, as shown in FIG. 17 depicting a first example traction member 406, upper surface 454 includes a plurality of posts 462 spaced apart from each other along the length of upper surface 454. In the example of FIG. 18 depicting a second example traction member 406, upper surface 454 includes a plurality of ridges and/or sipes. FIGS. 17 and 18 depict two examples of traction members 406, however traction members 406 may have any suitable texture on upper surface 454 to provide the traction or added grip.

Traction member 406 may comprise any suitable materials configured to engage the rider's foot and provide the traction or grip. For example, traction members may comprise or consist of a thermoplastic, a metal, a rubber, and/or any other suitable material. In some examples, traction member 406 may comprise a second material overmolded onto a portion of the traction member comprising a first material, e.g., overmolded onto at least a portion of upper surface 454. For example, base portion 458 and protruding portion 460 may comprise a metal or thermoplastic material and a rubber material may be overmolded onto upper surface 454 of protruding portion 460.

Figure 24:
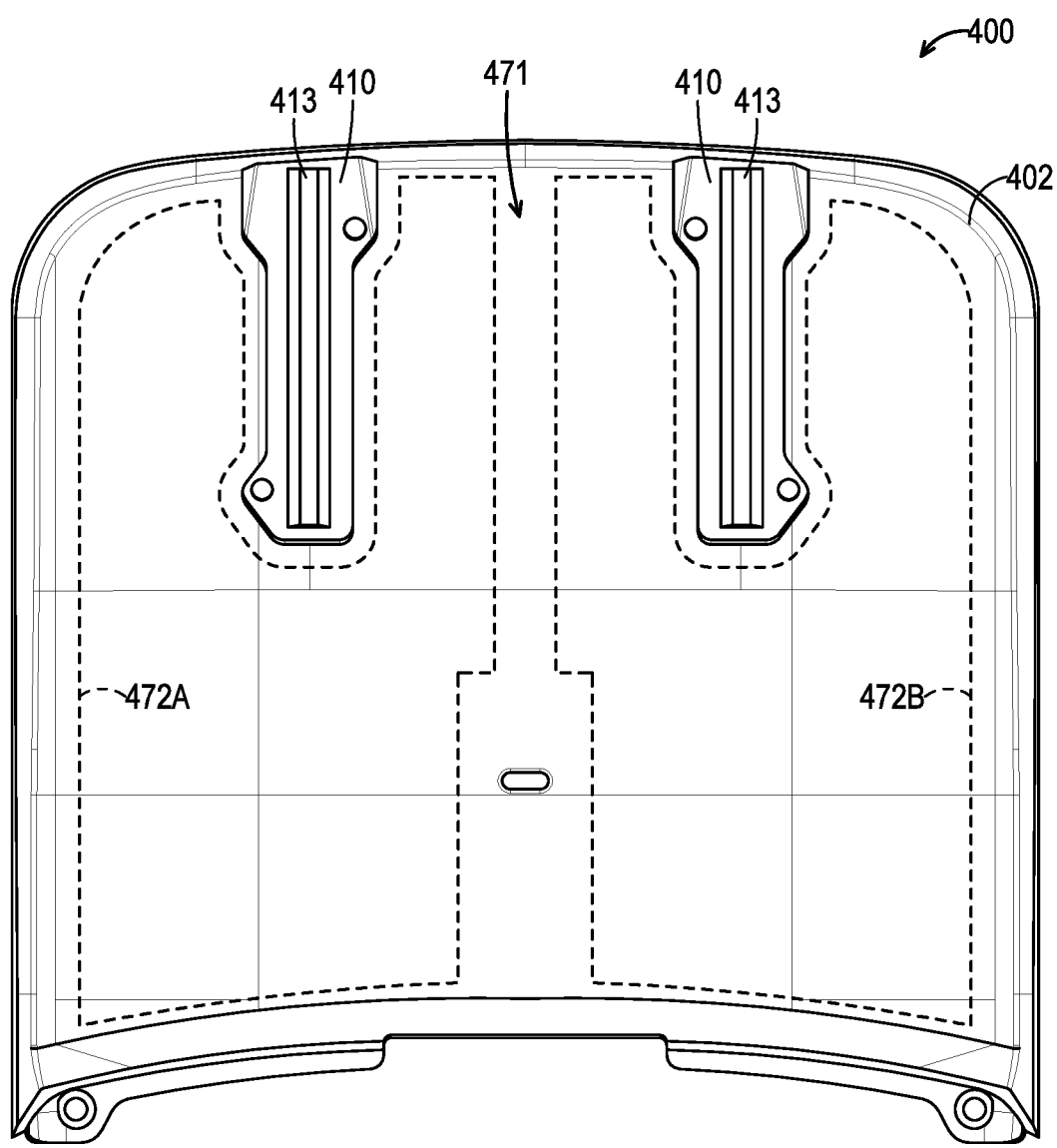
FIG. 24 is a top plan view of a footpad assembly including an integrated foot detection sensor in accordance with aspects of the present disclosure.
Figure 25:
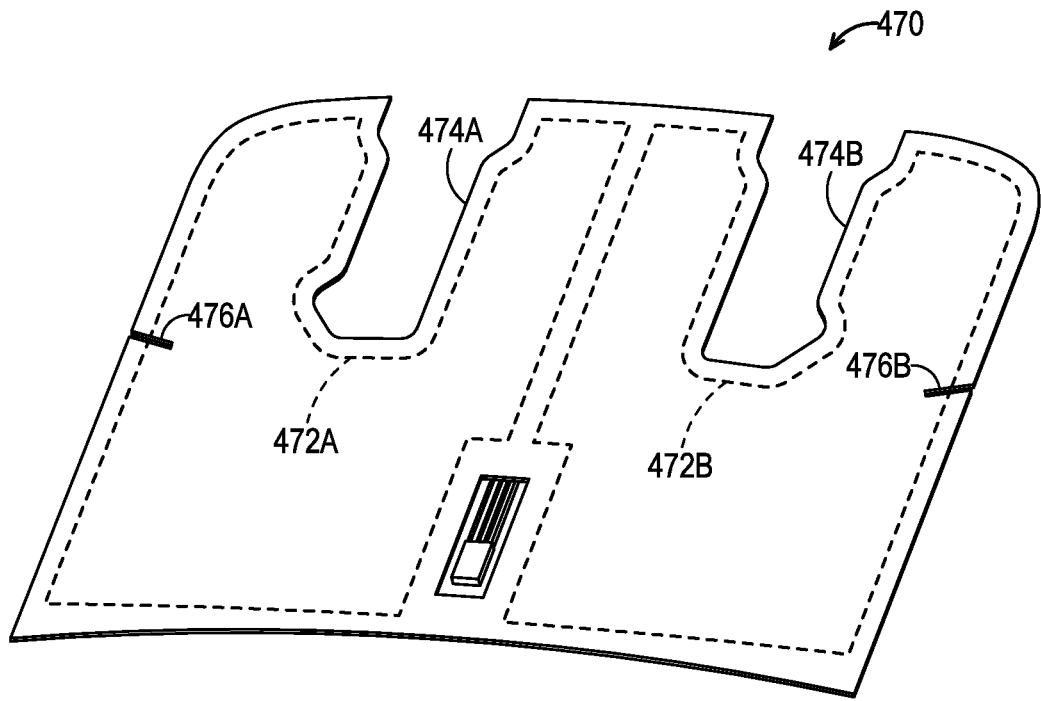
FIG. 25 is an isometric view of the foot detection sensor of FIG. 24.

In some examples, as shown in FIGS. 24 and 25, footpad assembly 400 includes a rider detection system 468 configured to determine whether a rider is on the electric vehicle including footpad assembly 400. Rider detection system 468 is an example of rider detection system 168, described above.

As shown in FIGS. 24 and 25, footpad assembly 400 includes a membrane switch 470 embedded or layered into footpad 402. In some examples, membrane switch 470 is layered directly beneath a non-skid sheet 471 (AKA external layer) which is configured to contact the rider's foot. Membrane switch 470 comprises a plastic (e.g., waterproof) laminate housing one or more force sensitive resistors or other suitable pressure sensors. In the example of FIGS. 24 and 25, membrane switch 470 includes a first pressure transducer 472A disposed on a first side of the membrane switch and a second pressure transducer 472B disposed on a second side of the membrane switch. First pressure transducer 472A is configured to detect pressure from a first portion (e.g., a toe) of the rider's foot and second pressure transducer 472B is configured to detect pressure from a second portion (e.g., a heel) of the rider's foot. The membrane switch is sized and shaped to position first pressure transducer 472A under the first portion of the rider's foot and second pressure transducer 472B under the second portion of the rider's foot. This facilitates the detection of the presence and stance of a rider based on which sensor or sensors is activated.

Membrane switch 470 includes a pair of slots 474A and 474B (AKA cutouts) each configured to accommodate a respective one of recesses 410 and inserts 412 of footpad assembly 400. For example, slots 474A and 474B may extend around recesses 410 formed in upper surface 408 of the footpad. Put another way, membrane switch 470 may be shaped to extend around recesses 410 formed in upper surface 408 of footpad 402. Slots 474A, 474B may have any suitable shape, size, and/or may extend in any suitable direction (e.g., longitudinally) in order to accommodate the recesses 410. In some examples, slots 474A, 474B extend longitudinally across at least a portion of membrane switch 470. This facilitates membrane switch 470 being used with footpads having foot engagement structures 401, described herein.

In some examples, as shown in FIG. 25, membrane switch 470 may further include a pair of angled slots 476A and 476B. Slots 474A, 474BB and/or angled slots 476A, 476B facilitate reducing stress in membrane switch 470 during bending or when conforming to curvature of footpad 402. For example, membrane switch 470 may be bendable (or flexible, e.g., slightly flexible) in one direction (e.g., on one axis), but may not be capable of compound curvature (e.g., simultaneously on two or more axes) without suffering stress and/or possible failure (e.g., sensor damage). Additionally, membrane switch 470 may be configured to accommodate and at least partially conform to the curvature of footpad 402, e.g., the concave-up curvature. Slots 474A, 474B and/or angled slots 474A, 474B may relieve stress during bending and facilitate membrane switch 470 conforming to the curvature of footpad 402.

In some examples, membrane switch 470 is layered onto a base layer of footpad 402 and sandwiched between the base layer and an upper layer of the footpad (e.g., non-skid sheet 471). In some examples, the base layer of the footpad comprises a resilient layer overmolded onto a rigid base layer. In such examples, resilient layer may comprise a rubber, foam, and/or other suitable resilient material and rigid base layer may comprise a thermoplastic polymer or other suitable rigid material. In some examples, the base layer comprises a single monolithic structure consisting of a single material.

D. Illustrative Combinations and Additional Examples

This section describes additional aspects and features of footpad assemblies including foot engagement structures, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. A footpad assembly for a self-balancing electric vehicle, the footpad assembly comprising:
 a footpad configured to be coupled to a frame of the vehicle and to receive a rider's foot, wherein a recess is defined in an upper surface of the footpad;
 an insert disposed in the recess and coupled to the footpad;
 a slot formed between the insert and a bottom wall of the recess; and
 a foot engagement member operatively coupled to the insert.

A1. The footpad assembly of paragraph A0, further comprising:
 a slot nut disposed entirely within the slot, wherein the slot nut is configured to be selectively translated along a length of the slot.

A1.1. The footpad assembly of paragraph A1, wherein the slot nut comprises a spring-loaded ball configured to retain the slot nut in a selected position within the slot when the spring is expanded and to permit the selective translation of the slot nut within the slot when the spring is compressed.

A1.2. The footpad assembly of paragraph A1 or A1.1, wherein the slot nut is configured to receive the foot engagement member.

A2. The footpad assembly of any one of paragraphs A1-A1.2, wherein the foot engagement member is releasably coupled to the slot nut.

A2.1. The footpad assembly of paragraph A2, wherein a position of the foot engagement member relative to the footpad is adjustable by translating the slot nut in a direction along the length of the slot.

A3. The footpad assembly of any one of paragraphs A2-A2.1, wherein the foot engagement member comprises:
 a rigid body configured to abut the rider's foot.

A3.1. The footpad assembly of paragraph A3, wherein the foot engagement member further comprises:
 a lateral adjustment bolt coupled to the rigid body and extending laterally across the rigid body; and
 a coupling member releasably coupled simultaneously to the slot nut and to the lateral adjustment bolt by a locking bolt, such that the rigid body is held in a fixed position and orientation relative to the insert.

A3.2. The footpad assembly of paragraph A3.1, wherein the coupling member is releasably coupled to the lateral adjustment bolt at a selected lateral position relative to the rigid body.

A3.3. The footpad assembly of paragraph A3.2, wherein the selected lateral position of the coupling member relative to the rigid body determines a lateral position of the rigid body relative to the insert of the footpad.

A3.4. The footpad assembly of any one of paragraphs A3.1-A3.3, wherein the coupling member is releasably coupled to the slot nut at a selected rotational orientation.

A3.5. The footpad assembly of paragraph A3.4, wherein the selected rotational orientation determines a rotational orientation of the rigid body relative to the footpad.

A4. The footpad assembly of any one of paragraphs A3-A3.3, wherein the rigid body extends upward above the upper surface of the footpad.

A4.1. The footpad assembly of paragraph A4, wherein the rigid body comprises a curved foot engagement surface configured to contact and at least partially conform to a side profile of the user's foot.

A4.2. The footpad assembly of paragraph A4 or A4.1, further comprising a resilient material overmolded onto at least a portion of the rigid body.

A4.3. The footpad assembly of paragraph A4.2, wherein the resilient material comprises an elastomer.

A5. The footpad assembly of paragraph A0, wherein the foot engagement member comprises a traction member.

A5.1. The footpad assembly of paragraph A5, wherein the traction member includes a protruding portion having an upper surface configured to engage a bottom surface of the rider's foot.

A5.2. The footpad assembly of paragraph A5.1, wherein the traction member comprises:
  a base portion disposed entirely within the slot and sandwiched between the insert and the bottom wall of the recess;
  wherein the protruding portion extends upward from the base portion through an opening of the insert, such that the upper surface of the protruding portion is positioned to engage the bottom surface of the rider's foot.

A5.3. The footpad assembly of paragraph A5.1 or A5.2, wherein the upper surface is textured.

A5.4. The footpad assembly of any one of paragraphs A5.1-A5.3, wherein the upper surface is generally coplanar with the upper surface of the footpad.

A5.5. The footpad assembly of any one of paragraphs A5.1-A5.4, wherein the upper surface comprises sipes, ridges, or channels configured to provide traction for the user's foot.

A5.6. The footpad assembly of any one of paragraphs A5.1-A5.4, wherein the upper surface comprises one or more protrusions extending upward.

A6. The footpad assembly of any one of paragraphs A0-A5.6, wherein the insert comprises metal.

A7. The footpad assembly of any one of paragraphs A0-A6, wherein the insert is fastened to the footpad using one or more bolts.

A8. The footpad assembly of any one of paragraphs A0-A7, wherein the recess and the insert extend longitudinally across at least a portion of the upper surface of the footpad.

A9. The footpad assembly of paragraph A0-A8, wherein the upper surface of the footpad has a concave-up profile.

A10. The footpad assembly of any one of paragraphs A0-A9, wherein the footpad defines a second recess in the upper surface and the footpad further comprises a second insert received in the second recess and coupled to the footpad, wherein the second insert comprises a second slot.

A10.1. The footpad assembly of paragraph A10, wherein the second insert is configured to be coupled to a second foot engagement member.

A11. The footpad assembly of any one of paragraphs A0-A10.1, further comprising a rider detection system integrated into the footpad.

A11.1. The footpad assembly of paragraph A11.1, wherein the rider detection system comprises:
  a membrane switch including one or more pressure transducers, wherein the membrane switch is layered into the footpad.

A11.2. The footpad assembly of paragraph A11.1, wherein the membrane switch comprises one or more slots each configured to extend around a respective one of the recesses in the upper surface of the footpad.

A11.3. The footpad assembly of paragraph A11.1 or A11.2, wherein the membrane switch comprises a first pressure transducer configured to detect pressure from a toe portion of a rider's foot and second pressure transducer configured to detect pressure from a heel portion of the rider's foot.

A12. The footpad assembly of any one of paragraphs A0-A11.3, wherein the footpad comprises a resilient layer covering a rigid base.

A12.1. The footpad assembly of paragraph A12, wherein the rigid base comprises a plastic.

A12.2. The footpad assembly of paragraph A12 or A12.1, wherein the resilient material comprises a rubber material.

A12.3. The footpad assembly of paragraph A12 or A12.1, wherein the resilient material comprises a foam.

A12.4. The footpad assembly of any one of paragraphs A12-A12.4, wherein the resilient layer is overmolded onto the rigid base.

A13. The footpad assembly of any one of paragraphs A0-A12.4, wherein the recess comprises an open channel formed in the upper surface of the footpad.

A14. The footpad assembly of any one of paragraphs A0-A12.4, wherein the insert is disposed in the recess, such that the insert is exposed to the rider's foot.

A15. The footpad assembly of any one of paragraphs A0-A14, wherein the insert has an opening formed in an upper surface of the insert, wherein the opening has a first width.

A15.1. The footpad assembly of paragraph A15, wherein the insert defines an interior cavity, wherein the interior cavity has a second width greater than the first width.

A16. The footpad assembly of any one of paragraphs A0-A15.1, wherein the footpad comprises a resilient layer and a rigid layer.

A16.1. The footpad assembly of paragraph A16, wherein the resilient layer comprises a foam material.

A16.2. The footpad assembly of paragraph A16 or A16.1, wherein the rigid layer comprises a thermoplastic polymer.

A16.3. The footpad assembly of any one of paragraphs A16-A16.2, wherein the resilient layer is overmolded onto the rigid layer.

A17. The footpad assembly of any one of paragraphs A0-A16.3, wherein the insert comprises a first material and the footpad comprises at least a second material different than the first material.

A17.1. The footpad assembly of paragraph A17, wherein the first material comprises metal.

A17.2. The footpad assembly of paragraph A17 or A17.1, wherein the at least one second material comprises a resilient material and a rigid material.

A17.3. The footpad assembly of paragraph A17.2, wherein the resilient material is overmolded onto the rigid material.

A17.4. The footpad assembly of paragraph A17.2 or A17.3, wherein the resilient material comprises a foam material and the rigid material comprises a thermoplastic polymer.

A18. A self-balancing electric vehicle including the footpad assembly of any one of paragraphs A0-A17.4.

A18.1. The self-balancing electric vehicle of paragraph A18 comprising:
  a board including a frame, a first deck portion disposed at a first end portion of the frame, and a second deck portion disposed at a second end portion of the frame, the first and second deck portions each configured to receive a left or right foot of a rider oriented generally perpendicular to a direction of travel of the board;
  a wheel assembly including a wheel rotatable about an axle, wherein the wheel is disposed between and extends above and below the first and second deck portions;
  a motor assembly configured to rotate the wheel about the axle to propel the vehicle; and
  an electronic controller configured to receive orientation information of the board measured by at least one sensor and to cause the motor assembly to propel the vehicle based on the orientation information.

A18.2. The self-balancing electric vehicle of paragraph A18.1, wherein the first deck portion comprises the footpad assembly of any one of paragraphs A0-A17.4.

A18.3. The self-balancing electric vehicle of paragraph A18.1 or A18.2, wherein the second deck portion comprises the footpad assembly of any one of paragraphs A0-A17.4.

B0. A footpad assembly for a self-balancing electric vehicle, the footpad assembly comprising:
  a footpad configured to be coupled to a frame of the vehicle and to receive a rider's foot;
  a first recess and a second recess defined in an upper surface of the footpad;
  a first insert disposed in the first recess and a second insert disposed in the second recess, wherein the first and second inserts are coupled to the footpad; and
  a first slot formed between the first insert and a first bottom wall of the first recess and a second slot formed between the second insert and a second bottom wall of the second recess.

B1. The footpad assembly of paragraph B0, further comprising:
  a foot stop operatively coupled to the first insert, wherein the foot stop includes a rigid body extending above the upper surface of the footpad; and
  a traction member operatively coupled to the second insert, wherein the traction member includes a protruding portion having an upper surface positioned to engage a bottom surface of the rider's foot.

B1.1. The footpad assembly of paragraph B1, wherein the rigid body includes a curved foot engagement surface configured to contact and at least partially conform to a side profile of the rider's foot.

B1.2. The footpad assembly of paragraph B1 or B1.1, wherein the traction member further comprises:
  a base portion disposed entirely within the second slot and sandwiched between the second insert and the second bottom wall;
  wherein the protruding portion of the traction member extends upward from the base portion through an opening in the second insert, such that the upper surface of the protruding portion is positioned to engage the bottom surface of the rider's foot.

B2. The footpad assembly of any one of paragraphs B0-B1.2, further comprising:
  a membrane switch including one or more pressure transducers, wherein the membrane switch is layered into the footpad.

B2.1. The footpad assembly of paragraph B2, wherein the membrane switch comprises a first pressure transducer configured to detect pressure from a toe portion of the rider's foot, and a second pressure transducer configured to detect pressure from a heel portion of the rider's foot.

B2.2. The footpad assembly of paragraph B2 or B2.1, wherein the membrane switch has a first membrane-switch slot extending around the first recess of the footpad and a second membrane-switch slot extending around the second recess of the footpad.

B2.3. The footpad assembly of any one of paragraphs B2-B2.2, wherein the membrane switch is layered between a base layer of the footpad and an upper layer of the footpad, wherein the upper layer includes the upper surface of the footpad configured to contact the rider's foot.

B3. The footpad assembly of any one of paragraphs B0-B2.3, wherein the first insert and the second insert each comprise a metal.

C0. A method of assembling a footpad assembly, the method comprising:
  removably coupling a foot engagement member to an insert coupled to a footpad of the assembly, such that the foot engagement member is disposed at a selected position and rotational orientation relative to the footpad.

C1. The method of paragraph C0 or C1, wherein the insert is disposed within a recess defined in an upper surface of the footpad.

C2. The method of paragraph C1, wherein removably coupling the foot engagement member to the insert comprises removably coupling the foot engagement member to a slot nut disposed within a slot formed between the insert and a bottom wall of the recess.

C2.1. The method of paragraph C2, further comprising:
  prior to removably coupling the foot engagement member to the slot nut, translating the slot nut along the slot to a selected longitudinal position.

C3. The method of any one of paragraphs C2-C2.1, wherein removably coupling the foot engagement member to the slot nut comprises:
  simultaneously coupling a coupling member of the foot engagement member to the slot nut and to a lateral adjustment bolt fixed to a rigid body of the foot engagement member.

C3.1. The method of paragraph C3, wherein simultaneously coupling the coupling member to the slot nut and the lateral adjustment bolt includes coupling a threaded portion of a locking bolt with a threaded opening of the slot nut.

C3.2. The method of paragraph C3.1, wherein the coupling member includes a clamp, and wherein coupling the threaded portion of the locking bolt with the slot nut simultaneously secures the clamp to the lateral adjustment bolt.

D0. A footpad assembly for a self-balancing electric vehicle, the footpad assembly comprising:
  a footpad configured to be coupled to a frame of the vehicle and to receive a rider's foot on an upper surface of the footpad, wherein a recess is defined in the upper surface;

an insert disposed in the recess and secured to the footpad, wherein the insert comprises an upper wall having an elongate opening and a side wall extending downward from a periphery of the upper wall, such that the upper wall is spaced from a floor of the recess to form a T-slot; and a foot engagement member operatively coupled to the insert.

D1. The footpad assembly of paragraph D0, further comprising:

a slot nut disposed entirely within the T-slot, wherein the slot nut is configured to be selectively translated along a length of the T-slot.

D1.1. The footpad assembly of paragraph D1, wherein the foot engagement member is releasably coupled to the T-slot nut.

D1.2. The footpad assembly of paragraph D1 or D1.1, wherein the foot engagement member further comprises:

a rigid body extending above the upper surface of the footpad, wherein the rigid body is configured to abut a side of the rider's foot;

a lateral adjustment rail extending laterally across the rigid body; and a coupling member comprising (a) a locking bolt releasably coupled to the slot nut and (b) a clamping portion clamped to the lateral adjustment rail, wherein a clamping pressure of the clamping portion is configured to be controlled by the locking bolt.

D1.3. The footpad assembly of paragraph D1.2, wherein the coupling member is configured to be selectively clamped to the lateral adjustment rail at a range of lateral positions relative to the rigid body.

D1.4. The footpad assembly of paragraph D1.2 or D1.3, wherein the rigid body includes a curved foot engagement surface configured to at least partially conform to a side profile of the rider's foot.

D2. The footpad assembly of any one of paragraphs D0-D1.4, wherein the insert comprises a first material and the footpad comprises a second material different than the first material.

D2.1. The footpad assembly of paragraph D2, wherein the first material comprises a metal.

D3. The footpad assembly of any one of paragraphs D0-D2.1, wherein the foot engagement member comprises a traction member including a base portion seated in a groove of the floor of the recess and a protruding portion having an upper surface configured to engage a bottom surface of the rider's foot.

D3.1. The footpad assembly of paragraph D3, wherein the base portion of the traction member is disposed entirely within the T-slot and sandwiched between the upper wall of the insert and the floor of the recess;

wherein the protruding portion extends upward from the base portion through the elongate opening of the insert, such that the upper surface of the protruding portion is positioned to engage the bottom surface of the rider's foot.

D3.2. The footpad assembly of paragraph D3 or D3.1, wherein the upper surface of the protruding portion is textured.

D4. The footpad assembly of any one of paragraphs D0-D3.2, wherein the recess extends longitudinally across at least a portion of the upper surface of the footpad.

E0. A footpad assembly for a self-balancing electric vehicle, the footpad assembly comprising:

a footpad configured to be coupled to a frame of the vehicle and to receive a rider's foot on an upper surface of the footpad;

a first recess and a second recess defined in the upper surface of the footpad;

a first slotted insert disposed in the first recess and a second slotted insert disposed in the second recess, wherein the first and second slotted inserts are secured to the footpad; and a first T-slot formed between the first slotted insert and a first floor of the first recess and a second T-slot formed between the second slotted insert and a second floor of the second recess.

E1. The footpad assembly of paragraph E0, further comprising:

a foot stop operatively coupled to the first slotted insert, wherein the foot stop includes a rigid body extending above the upper surface of the footpad; and a traction member operatively coupled to the second slotted insert, wherein the traction member includes a base portion seated in a groove of the second floor of the second recess and a protruding portion having an upper surface configured to engage a bottom surface of the rider's foot.

E1.1. The footpad assembly of paragraph E1, wherein the rigid body includes a curved foot engagement surface configured to at least partially conform to a side profile of the rider's foot.

E1.2. The footpad assembly of paragraph E1 or E1.1, wherein the base portion of the traction member is disposed entirely within the second T-slot and sandwiched between the second slotted insert and the second bottom wall;

wherein the protruding portion of the traction member extends upward from the base portion through an opening in an upper wall of the second slotted insert, such that the upper surface of the protruding portion is positioned to engage the bottom surface of the rider's foot.

E2. The footpad assembly of any one of paragraphs E0-E1.2, further comprising:

a membrane switch including one or more pressure transducers, wherein the membrane switch is layered into the footpad.

E2.1. The footpad assembly of paragraph E2, wherein the membrane switch has a first elongate cutout extending around the first recess of the footpad and a second elongate cutout extending around the second recess of the footpad.

E2.2. The footpad assembly of paragraph E2 or E2.1, wherein the first and second elongate cutouts extend longitudinally inwards from an edge of the membrane switch.

E2.3. The footpad assembly of any one of paragraphs E2-E2.2, wherein the membrane switch is layered between a base layer of the footpad and an upper layer of the footpad, wherein the upper layer includes the upper surface of the footpad configured to contact the rider's foot.

E3. The footpad assembly of any one of paragraphs E0-E2.3, wherein the first recess and the second recess extend longitudinally across at least a portion of the upper surface of the footpad.

E4. The footpad assembly of any one of paragraphs E0-E3, wherein the first slotted insert and the second slotted insert each comprise a metal.

Advantages, Features, and Benefits

The different embodiments and examples of the footpad assemblies described herein provide several advantages over known solutions for electric vehicle of footpads. For example, illustrative embodiments and examples described herein allow one or more foot engagement structures coupled to a footpad that are configured to prevent undesired movement of the rider's foot relative to the footpad, e.g., prevent the rider's foot from slipping while riding. The foot engagement structures may comprise foot stops which extend above the footpad to abut a side profile of the rider's foot, traction inserts configured to contact the bottom of the rider's foot and provide added traction or grip, and/or any other suitable structures.

Additionally, and among other benefits, illustrative embodiments and examples described herein allow footpads that are configured to be coupled to various different types of foot engagement structures and facilitate user adjustment of the position and rotational orientation of the foot engagement members relative to the footpad. The footpads include inserts received in recesses of the footpad and each inserts may be coupled to various different types of foot engagement structures.

Additionally, and among other benefits, illustrative embodiments and examples described herein allow a rider detection system (e.g., rider detection sensor) to be integrated into the footpads having the foot engagement structures. The rider detection system is configured to detect the presence and/or stance of a rider standing on the footpad and communicate the detected information to a control unit of the electric vehicle.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A footpad assembly for a self-balancing electric vehicle, the footpad assembly comprising:
   a footpad configured to be coupled to a frame of the vehicle and to receive a rider's foot on an upper surface of the footpad, wherein a recess is defined in the upper surface;
   an insert disposed in the recess and secured to the footpad, wherein the insert comprises an upper wall having an elongate opening and a side wall extending downward from a periphery of the upper wall, such that the upper wall is spaced from a floor of the recess to form a T-slot; and
   a foot engagement member operatively coupled to the insert.

2. The footpad assembly of claim 1, further comprising:
   a slot nut disposed entirely within the T-slot, wherein the slot nut is configured to be selectively translated along a length of the T-slot.

3. The footpad assembly of claim 2, wherein the foot engagement member is releasably coupled to the slot nut.

4. The footpad assembly of claim 2, wherein the foot engagement member further comprises:
   a rigid body extending above the upper surface of the footpad, wherein the rigid body is configured to abut a side of the rider's foot;
   a lateral adjustment rail extending laterally across the rigid body; and
   a coupling member comprising (a) a locking bolt releasably coupled to the slot nut and (b) a clamping portion clamped to the lateral adjustment rail, wherein a clamping pressure of the clamping portion is configured to be controlled by the locking bolt.

5. The footpad assembly of claim 4, wherein the coupling member is configured to be selectively clamped to the lateral adjustment rail at a range of lateral positions relative to the rigid body.

6. The footpad assembly of claim 4, wherein the rigid body includes a curved foot engagement surface configured to at least partially conform to a side profile of the rider's foot.

7. The footpad assembly of claim 1, wherein the insert comprises a first material and the footpad comprises a second material different than the first material.

8. The footpad assembly of claim 7, wherein the first material comprises a metal.

9. The footpad assembly of claim 1, wherein the foot engagement member comprises a traction member including a base portion seated in a groove of the floor of the recess and a protruding portion having an upper surface configured to engage a bottom surface of the rider's foot.

10. The footpad assembly of claim 9, wherein the base portion of the traction member is disposed entirely within the T-slot and sandwiched between the upper wall of the insert and the floor of the recess;
    wherein the protruding portion extends upward from the base portion through the elongate opening of the insert, such that the upper surface of the protruding portion is positioned to engage the bottom surface of the rider's foot.

11. The footpad assembly of claim 9, wherein the upper surface of the protruding portion is textured.

12. The footpad assembly of claim 1, wherein the recess extends longitudinally across at least a portion of the upper surface of the footpad.

13. A footpad assembly for a self-balancing electric vehicle, the footpad assembly comprising:
   a footpad configured to be coupled to a frame of the vehicle and to receive a rider's foot on an upper surface of the footpad;
   a first recess and a second recess defined in the upper surface of the footpad;
   a first slotted insert disposed in the first recess and a second slotted insert disposed in the second recess, wherein the first and second slotted inserts are secured to the footpad; and
   a first T-slot formed between the first slotted insert and a first floor of the first recess and a second T-slot formed between the second slotted insert and a second floor of the second recess.

14. The footpad assembly of claim 13, further comprising:
a foot stop operatively coupled to the first slotted insert, wherein the foot stop includes a rigid body extending above the upper surface of the footpad.

15. The footpad assembly of claim 14, wherein the rigid body includes a curved foot engagement surface configured to at least partially conform to a side profile of the rider's foot.

16. The footpad assembly of claim 13, further comprising a traction member operatively coupled to the second slotted insert, wherein the traction member includes a base portion seated in a groove of the second floor of the second recess and a protruding portion having an upper surface configured to engage a bottom surface of the rider's foot, wherein the base portion of the traction member is disposed entirely within the second T-slot and sandwiched between an upper wall of the second slotted insert and the second floor; and
wherein the protruding portion of the traction member extends upward from the base portion through an opening in the upper wall of the second slotted insert, such that the upper surface of the protruding portion is positioned to engage the bottom surface of the rider's foot.

17. The footpad assembly of claim 13, further comprising:
a membrane switch including one or more pressure transducers, wherein the membrane switch is layered into the footpad.

18. The footpad assembly of claim 17, wherein the membrane switch has a first elongate cutout extending around the first recess of the footpad and a second elongate cutout extending around the second recess of the footpad.

19. The footpad assembly of claim 18, wherein the first elongate cutout and the second elongate cut out extend longitudinally inwards from an edge of the membrane switch.

20. The footpad assembly of claim 17, wherein the membrane switch is layered between a base layer of the footpad and an upper layer of the footpad, wherein the upper layer includes the upper surface of the footpad configured to contact the rider's foot.

* * * * *